(12) United States Patent
Lee et al.

(10) Patent No.: US 10,970,373 B2
(45) Date of Patent: Apr. 6, 2021

(54) MOBILE TERMINAL AND METHOD FOR CONTROLLING THE SAME

(71) Applicant: LG ELECTRONICS INC., Seoul (KR)

(72) Inventors: Sookyeong Lee, Seoul (KR); Janghwan Jeon, Seoul (KR); Taekon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 16/422,697

(22) Filed: May 24, 2019

(65) Prior Publication Data
US 2020/0042683 A1    Feb. 6, 2020

(30) Foreign Application Priority Data

Aug. 6, 2018 (KR) .................... 10-2018-0091469

(51) Int. Cl.
| | |
|---|---|
| *G06K 9/00* | (2006.01) |
| *G06F 21/32* | (2013.01) |
| *G06F 3/0488* | (2013.01) |
| *G07C 9/00* | (2020.01) |
| *G06T 7/00* | (2017.01) |
| *H04M 1/725* | (2021.01) |

(Continued)

(52) U.S. Cl.
CPC ............ *G06F 21/32* (2013.01); *G06F 3/0488* (2013.01); *G06K 9/00885* (2013.01); *G06T 7/0012* (2013.01); *G07C 9/00563* (2013.01); *G07C 9/37* (2020.01); *H04L 63/0861* (2013.01); *H04M 1/72522* (2013.01); *G06T 2207/30101* (2013.01); *H04M 2250/22* (2013.01)

(58) Field of Classification Search
None
See application file for complete search history.

(56) References Cited

U.S. PATENT DOCUMENTS 8,245,879 B2 *    8/2012   Wegelin ................... G07C 9/37
                                                                222/52
10,592,721 B2 *   3/2020   Lee ........................ H04L 9/3231
(Continued)

FOREIGN PATENT DOCUMENTS

| KR | 10-2011-0118633 A | 10/2011 |
|---|---|---|
| KR | 10-2014-0109158 A | 9/2014 |

(Continued)

*Primary Examiner* — Soo Jin Park
(74) *Attorney, Agent, or Firm* — Birch, Stewart, Kolasch & Birch, LLP

(57) ABSTRACT

A mobile terminal according to the present disclosure can include a main body, a touch screen disposed on a front side of the main body, a first sensor disposed on the front side to sense the approach of an object to the main body in a locked state, a second sensor disposed in proximity to the first sensor to be driven in either one of a sleep mode and an active mode so as to acquire a vein image of an object that has approached the first sensor in the active mode, and a controller configured to perform vein authentication using the vein image acquired through the second sensor, and control the touch screen to display security information allowed to access for a pre-registered user when the vein image corresponds to a vein image of the pre-registered user as a result of the authentication.

20 Claims, 25 Drawing Sheets

(51) Int. Cl.
*H04L 29/06* (2006.01)
*G07C 9/37* (2020.01)

(56) References Cited

U.S. PATENT DOCUMENTS

| | | | |
|---|---|---|---|
| 2012/0162403 A1* | 6/2012 | Bae | H04N 7/183 |
| | | | 348/77 |
| 2013/0174094 A1* | 7/2013 | Heo | G06F 3/04883 |
| | | | 715/835 |
| 2014/0201827 A1* | 7/2014 | Okazaki | G06F 1/169 |
| | | | 726/7 |
| 2015/0253428 A1* | 9/2015 | Holz | G01S 17/36 |
| | | | 356/5.01 |
| 2015/0286873 A1* | 10/2015 | Davis | G06F 1/1694 |
| | | | 382/103 |
| 2016/0063230 A1* | 3/2016 | Alten | G06F 21/32 |
| | | | 726/28 |
| 2016/0189137 A1 | 6/2016 | Zhou et al. | |
| 2016/0253047 A1* | 9/2016 | Kim | G06F 3/0481 |
| | | | 715/764 |
| 2017/0372122 A1* | 12/2017 | Shim | H04W 12/0605 |
| 2018/0336428 A1* | 11/2018 | Ichige | G06K 9/00013 |
| 2019/0278973 A1* | 9/2019 | Setlak | G06K 9/22 |
| 2020/0160081 A1* | 5/2020 | Nakamura | H04N 5/33 |

FOREIGN PATENT DOCUMENTS

| | | |
|---|---|---|
| KR | 10-2016-0105121 A | 9/2016 |
| KR | 10-2018-0014627 A | 2/2018 |

\* cited by examiner

FIG. 2A
(a)
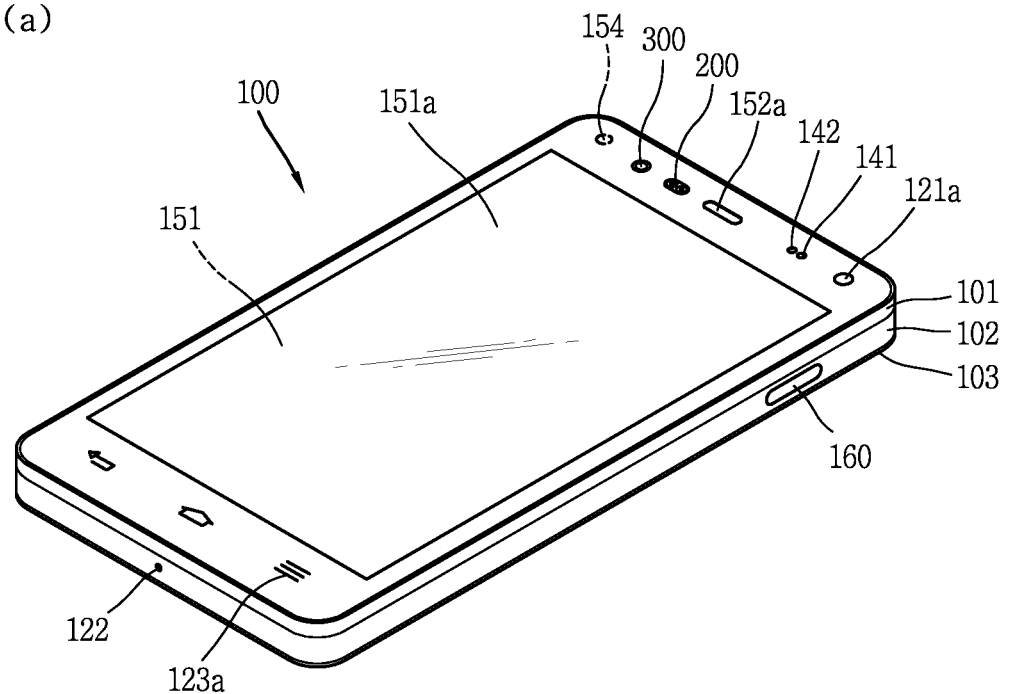
(b)
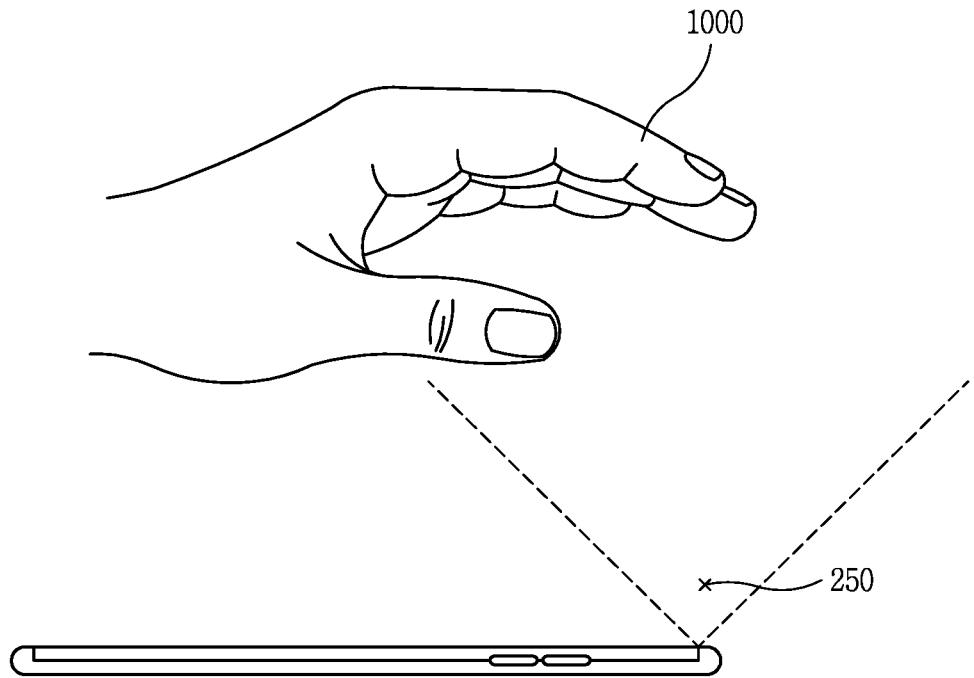

FIG. 2B
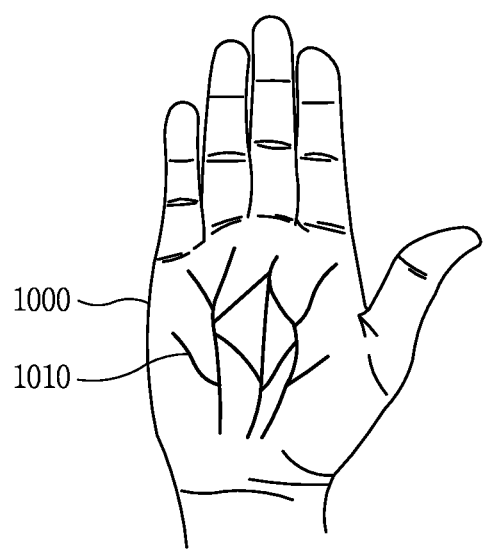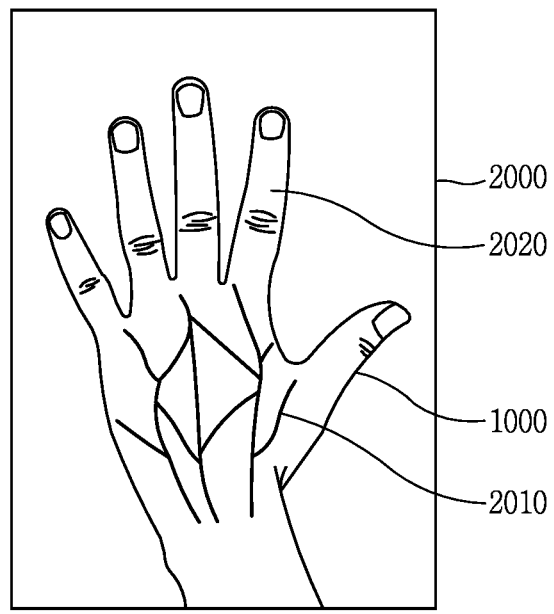

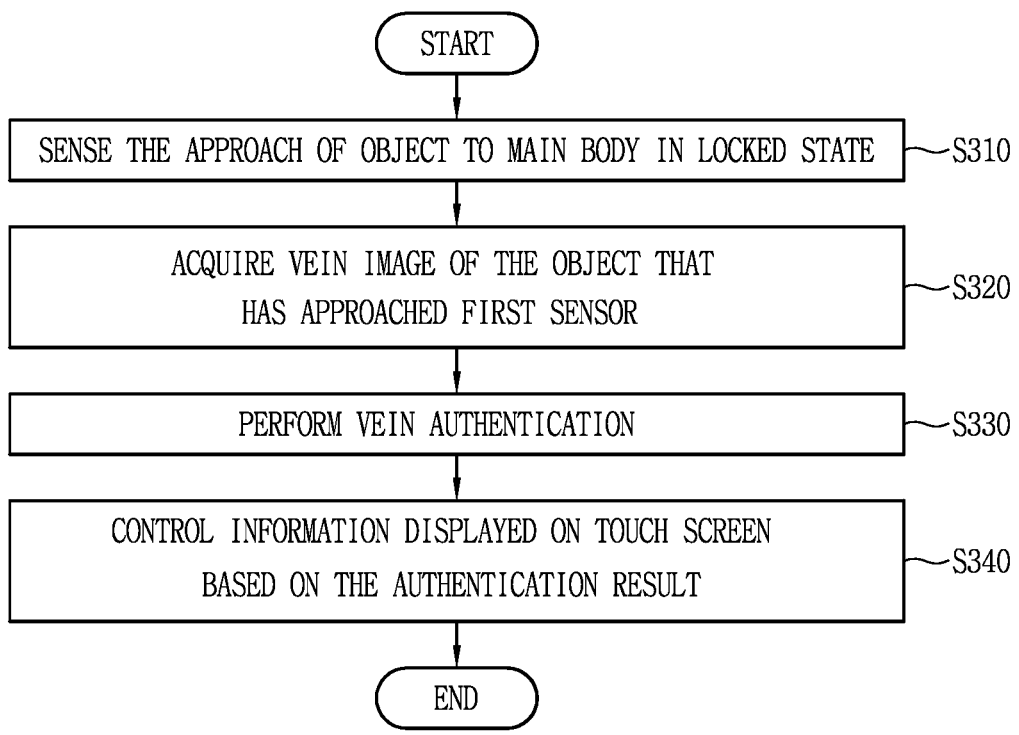

FIG. 4
(a)
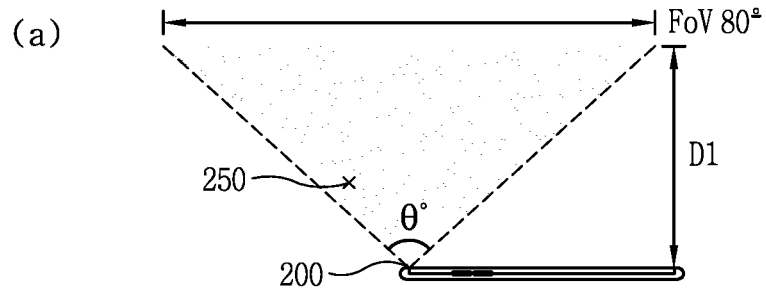
(b)
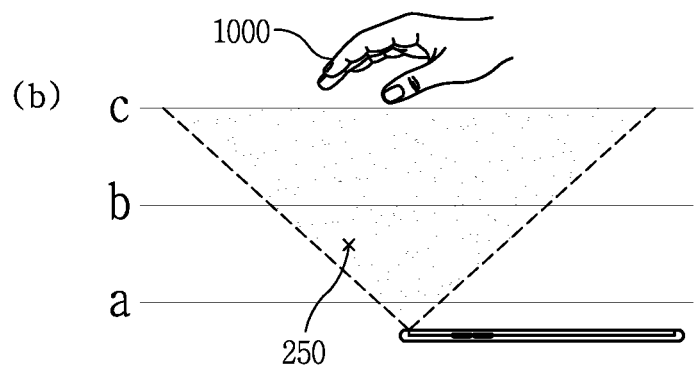
(c)
(d)
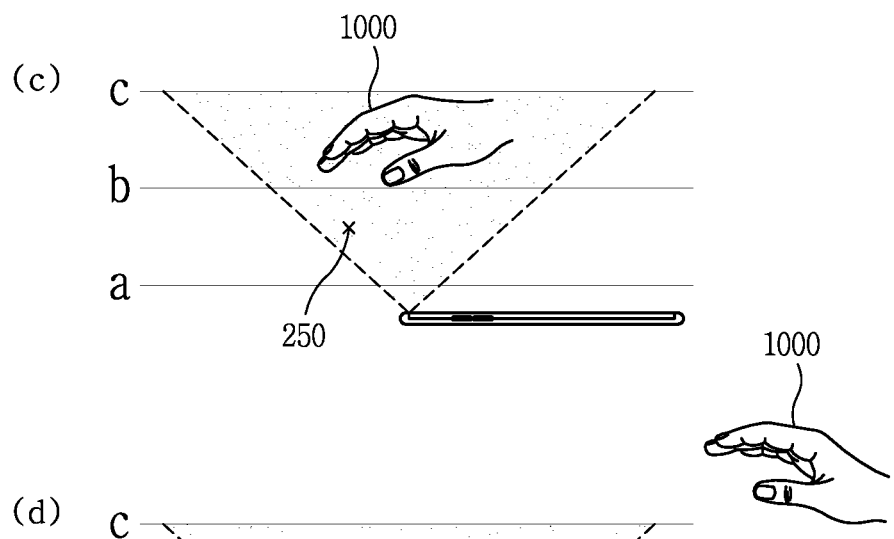

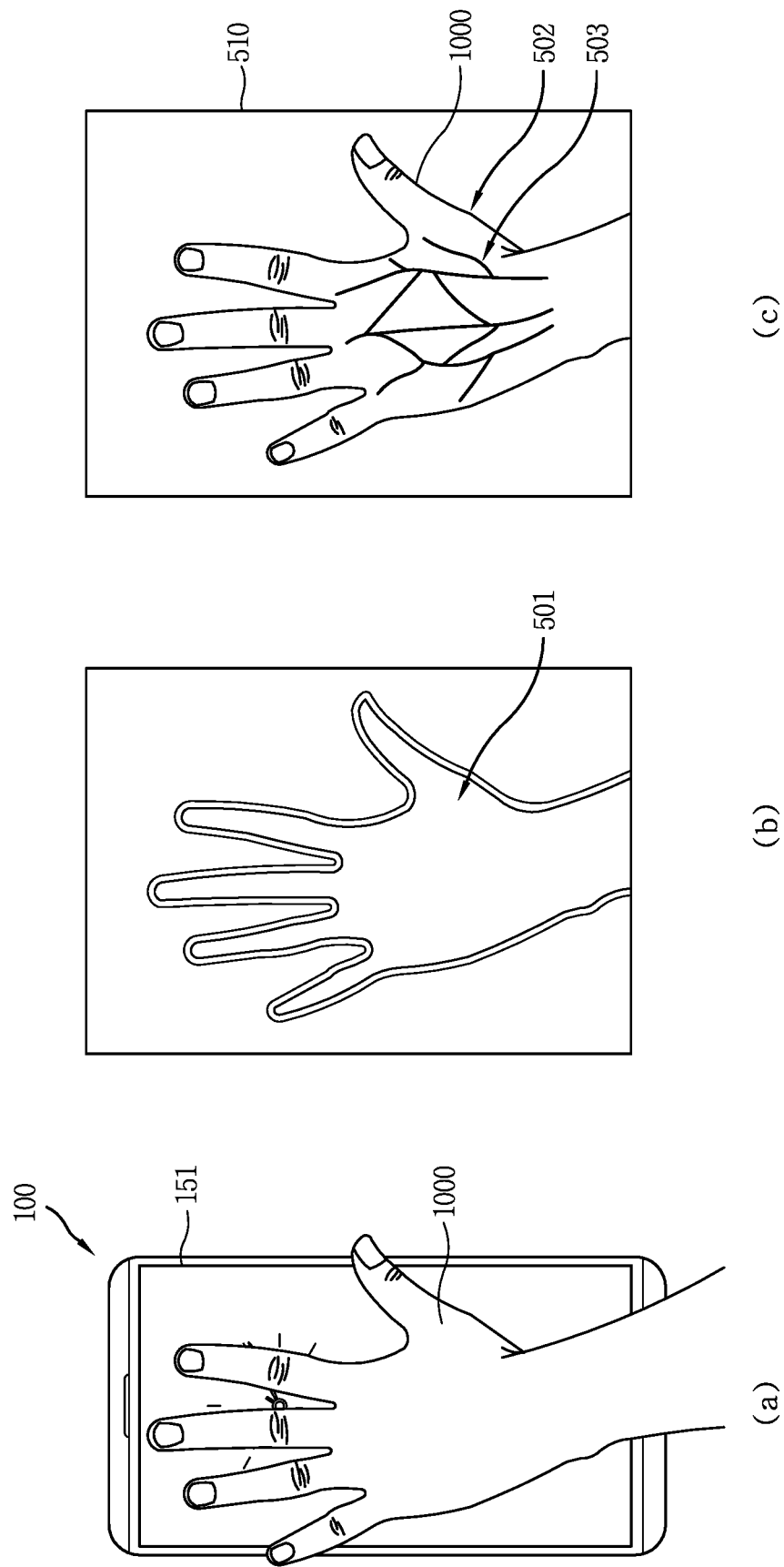

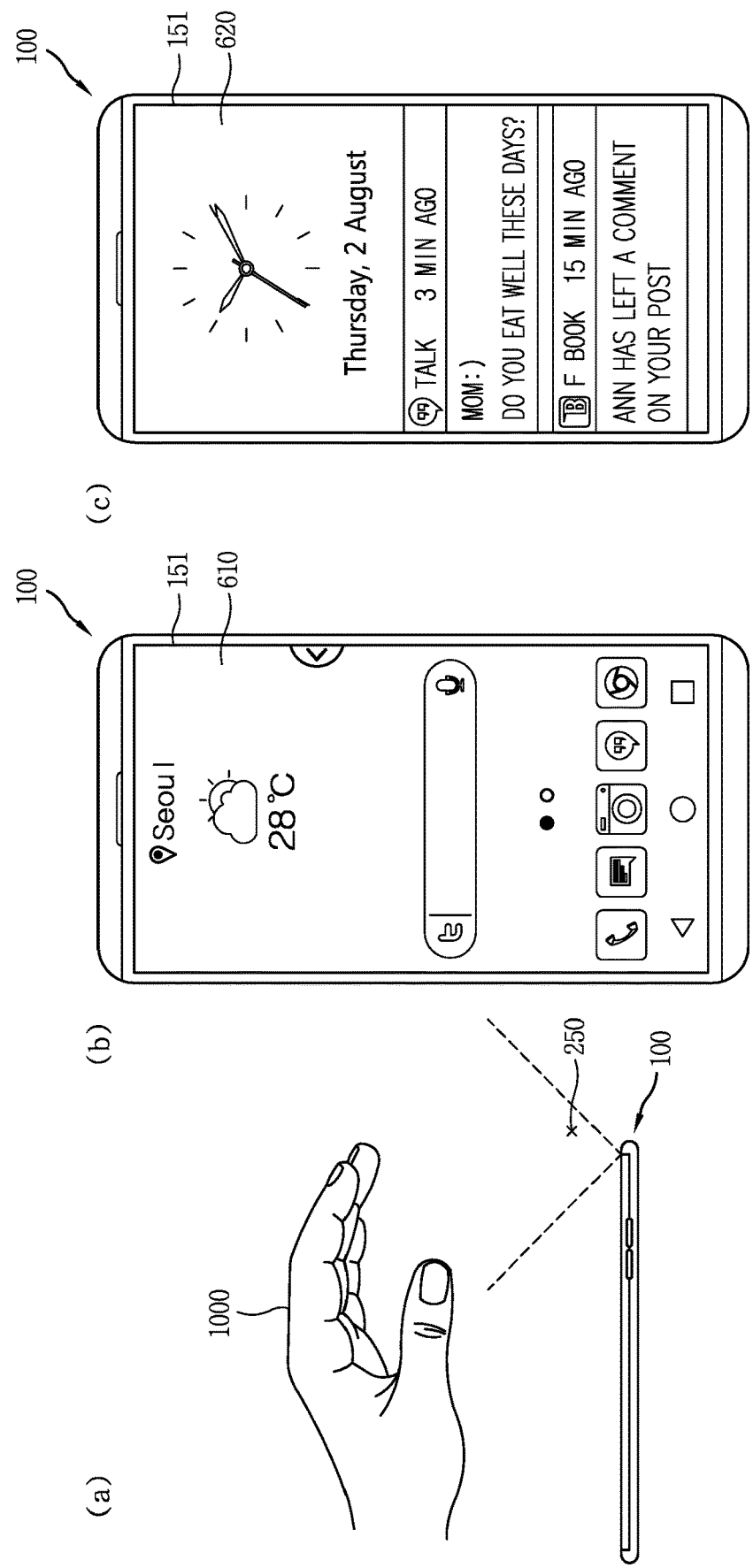

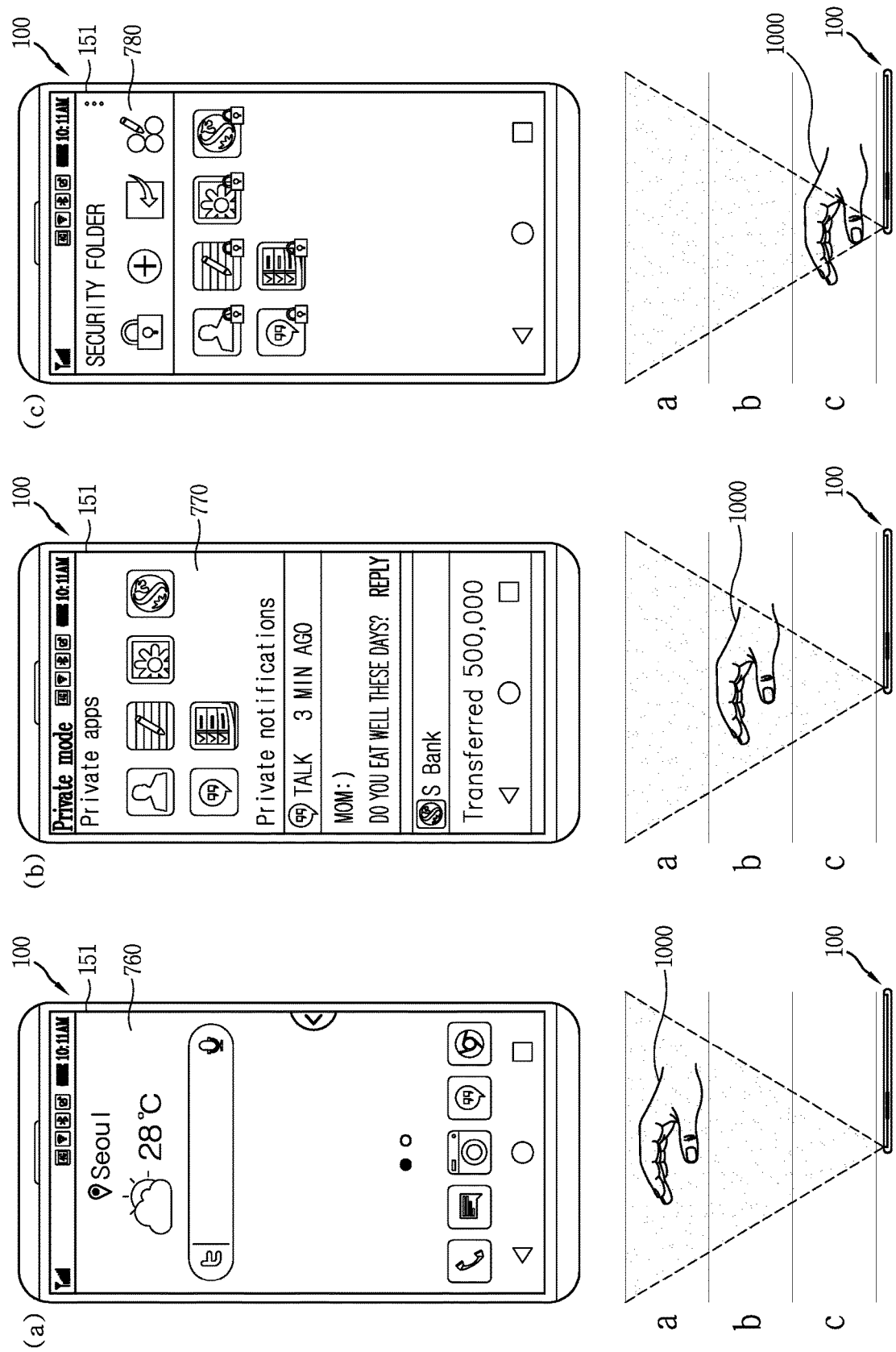

FIG. 12A
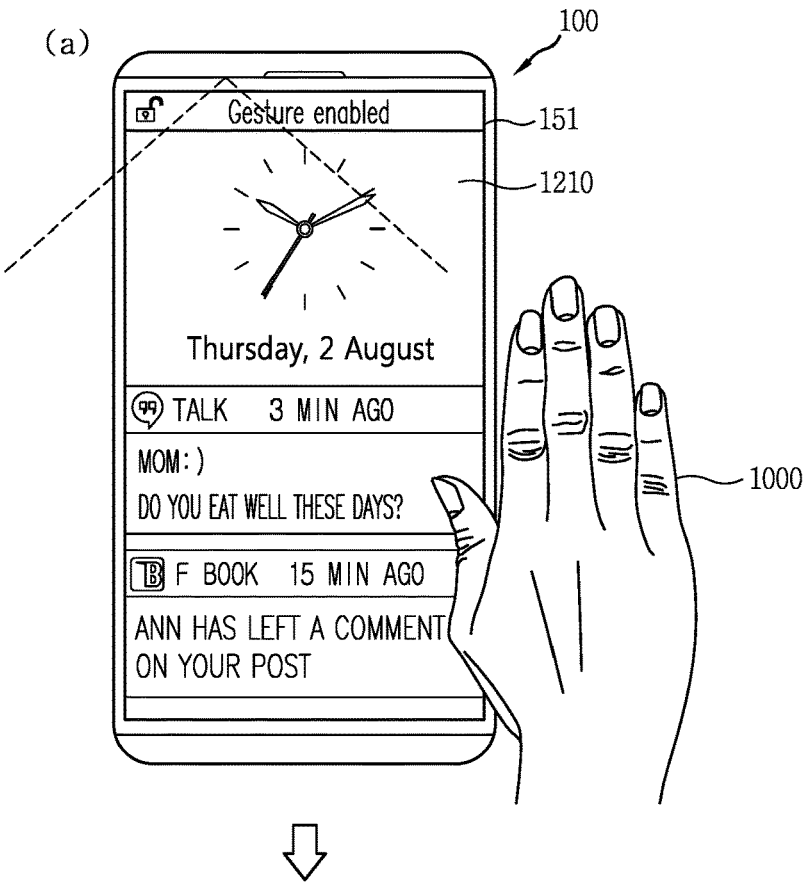
(a)
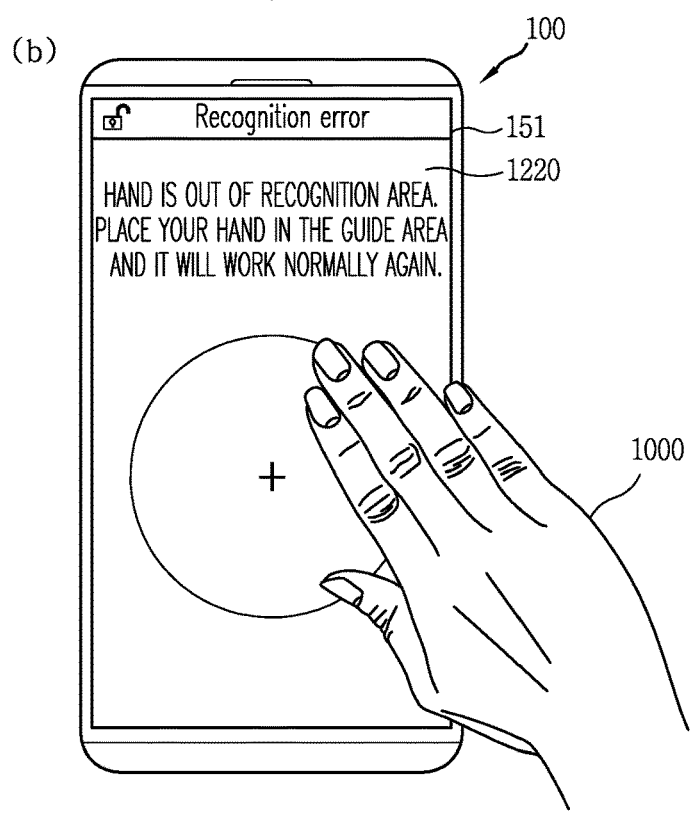
(b)

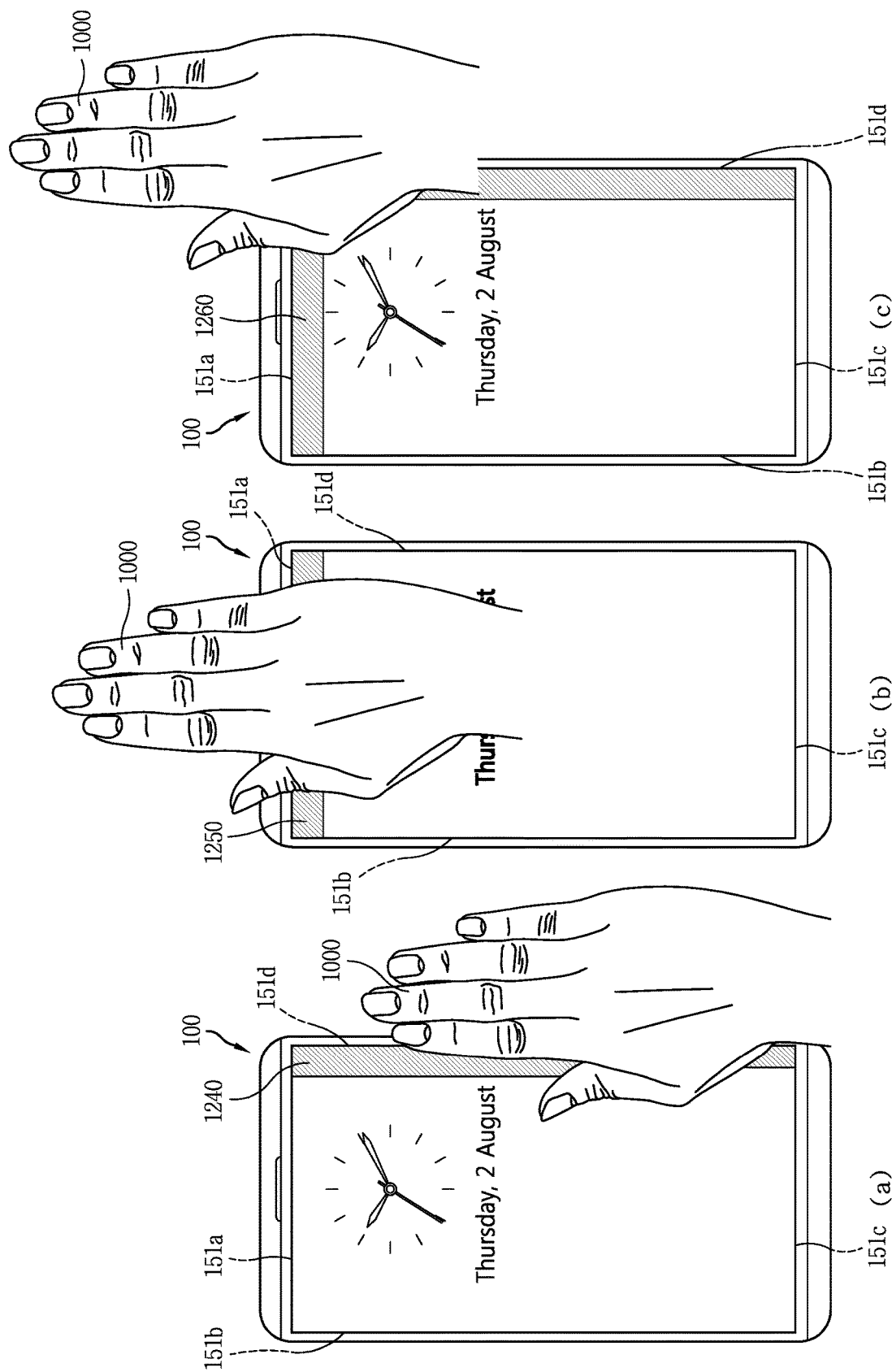

FIG. 12D
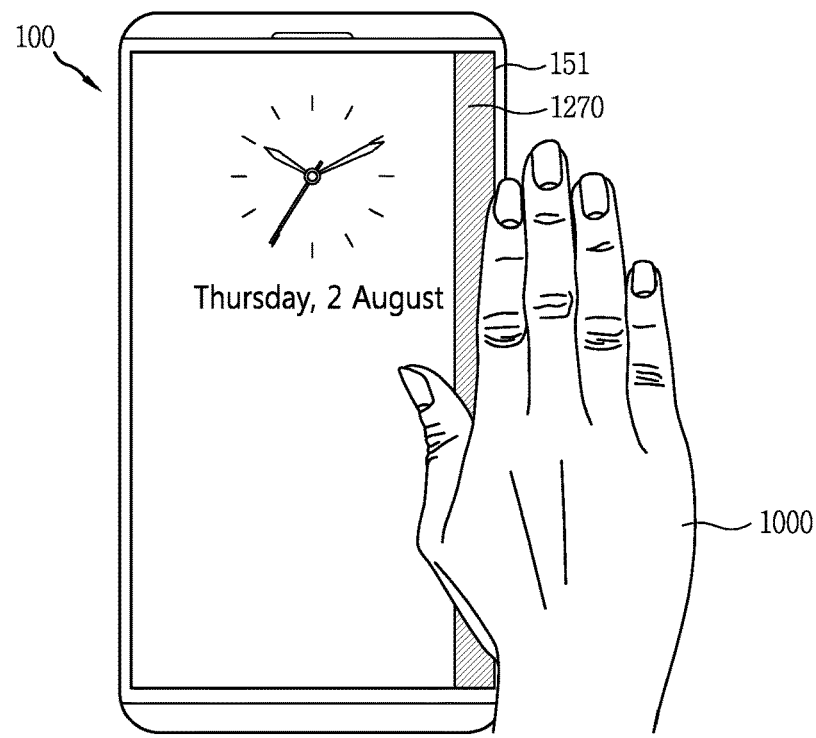
(a)
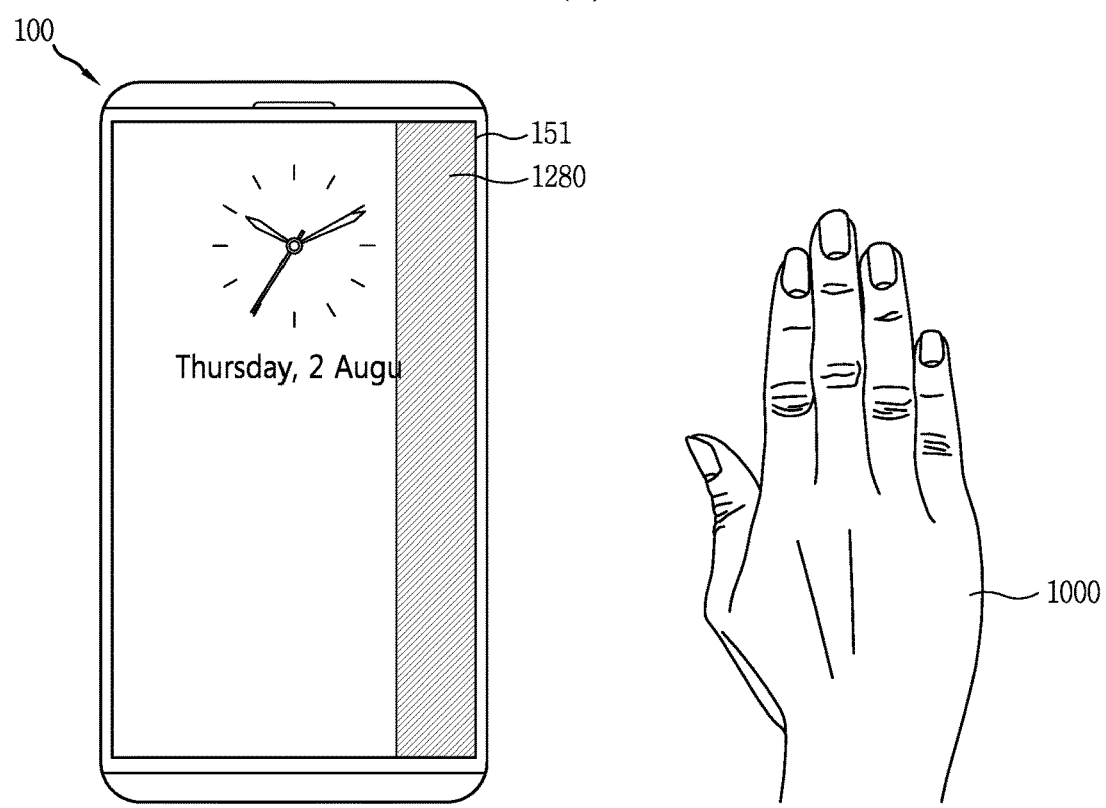
(b)

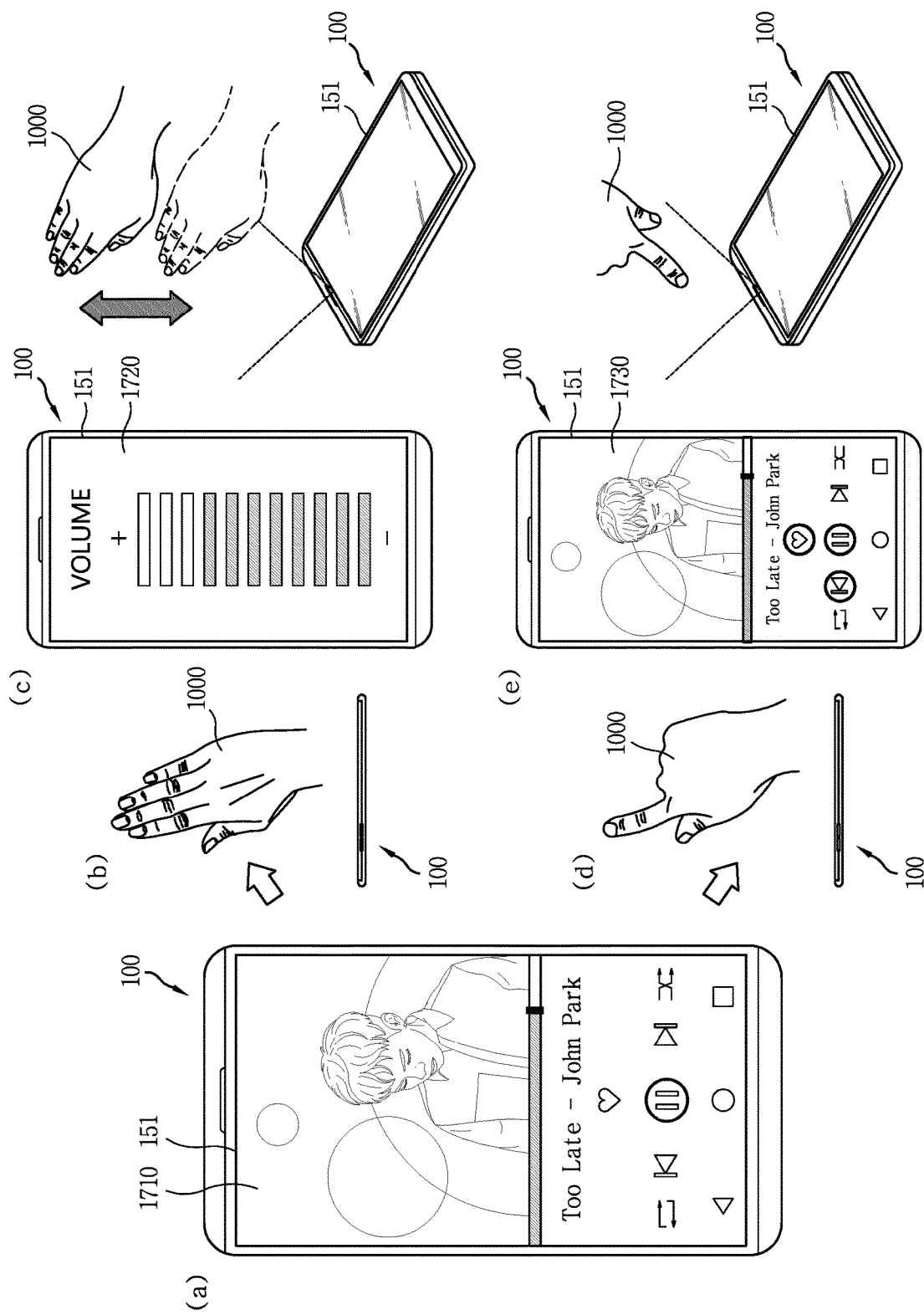

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2018-0091469, filed on Aug. 6, 2018, the contents of which is incorporated by reference herein in its entirety.

BACKGROUND OF THE INVENTION

1. Field of the Invention

The present disclosure relates to a mobile terminal for sensing a user's vein to perform biometric authentication and a control method thereof.

2. Description of the Related Art

Terminals may be divided into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

In recent years, as the functions of terminals have been diversified, financial information and privacy information are stored in terminals, and therefore, importance of security for terminals is gradually increasing.

Therefore, in addition to maintaining terminal security through a conventional password and touch pattern input, in recent years, a biometric authentication method of authenticating a user using the user's biometric information (e.g., fingerprint, iris, face, etc.) with a higher level of security has been actively used.

However, even in the case of authentication using such biometric information, imitation by a third party may be carried out, and thus a perfect level of security cannot be assured, and there is a continuous demand for another authentication method.

SUMMARY OF THE INVENTION

An object of the present disclosure is to provide a mobile terminal for sensing a user's vein to perform user authentication and a control method thereof.

Furthermore, another object of the present disclosure is to provide a mobile terminal capable of accurately knowing a user's intention to use the mobile terminal through a security unlock process with a plurality of steps and a control method thereof.

In addition, still another object of the present disclosure is to provide a mobile terminal capable of performing vein authentication while saving terminal power consumption and a control method thereof.

Moreover, yet still another object of the present disclosure is to provide a mobile terminal capable of authenticating a user's vein located on a sensing area even when the mobile terminal is in a standby state or a locked state and a control method thereof.

A mobile terminal according to the present disclosure may include a main body, a touch screen disposed on a front side of the main body, a first sensor disposed on the front side to sense the approach of an object to the main body in a locked state, a second sensor disposed in proximity to the first sensor to be driven in either one of a sleep mode and an active mode so as to acquire a vein image of an object that has approached the first sensor in the active mode, and a controller configured to perform vein authentication using the vein image acquired through the second sensor, and control the touch screen to display security information allowed to access for a pre-registered user when the vein image corresponds to a vein image of the pre-registered user as a result of the authentication, wherein the first sensor senses the approach of the object to the main body while the second sensor is driven in the sleep mode, and the second sensor changes a driving mode from the sleep mode to the active mode when an object that has approached the first sensor corresponds to a pre-specified body part.

According to an embodiment, the first sensor may maintain a low power active mode driven with power equal to or less than a preset value in the locked state, and the second sensor may be driven in either one of the sleep mode and the active mode according to whether the object is the pre-specified body part in the locked state.

According to an embodiment, an active event signal for changing an operation mode of the second sensor may be generated when the pre-specified body part is sensed by the first sensor in the locked state, and the operation mode of the second sensor may be changed from the sleep mode to the active mode in response to the active event signal, and the controller may maintain the locked state while the vein image of the pre-specified body part is acquired through the second sensor operating in the active mode.

According to an embodiment, the controller may control the second sensor to allow the operation mode of the second sensor to be maintained in the sleep mode in the locked state when an object that has approached the first sensor does not correspond to the pre-specified body part.

According to an embodiment, the locked state may be switched to a completely unlocked state through first and second unlocking processes, and the first unlocking process may be a process of determining whether the vein image acquired through the second sensor corresponds to a vein image of the pre-registered user, and the second unlocking process may be a process of sensing a preset gesture of the object, and a state in which the security information is displayed may be a first unlocked state.

According to an embodiment, the security information may include at least one event information generated in an application installed in the terminal, and the controller may control the touch screen to end the display of the security information, and switch the first unlocked state to the locked state when the preset gesture of the object is not sensed within a preset period of time after the security information is displayed in the first unlocked state.

According to an embodiment, the controller may control the touch screen to display additional security information when the preset gesture of the object is sensed within a preset period of time in the first unlocked state, and switch the first unlocked state to a completely unlocked state.

According to an embodiment, the second sensor may include an infrared light emitting portion configured to emit light containing an infrared region wavelength, and a depth sensing unit configured to receive light emitted from the infrared light emitting unit and reflected from the object located in the sensing area of the second, and acquire the vein image based on the arrival time of the received light, wherein a sensing area of the second sensor is a three-dimensional space defined within a preset distance and angular range with respect to an area disposed with the second sensor in the main body.

According to an embodiment, the controller may display guide information for guiding the positional movement of the object when the object is located within the sensing area in a state that does not satisfy a preset occupancy criterion.

According to an embodiment, the touch screen may have a plurality of sides, and the guide information may include an indicator for guiding the movement direction of the object, and the indicator may be displayed in proximity to at least one side closest to the object among the plurality of sides of the touch screen.

According to an embodiment, the indicator may include a bar-shaped image extended along the at least one side, and the controller may control the touch screen to vary a display thickness of the image according to a degree of the object being out of the sensing area.

According to an embodiment, the controller may perform control related to at least part of the security information based on a preset gesture of the object located in the sensing area while the security information is displayed.

According to an embodiment, the security information may include at least one content related to at least one application, and the controller may perform control related to specific content displayed in an area corresponding to a place where the object is located among the at least one content when the preset gesture is sensed.

According to an embodiment, a plurality of security information may exist in page units, and the controller may control the touch screen to display security information contained in any one of the plurality of pages based on a relative distance between the main body and the object sensed through the depth sensing unit.

A mobile terminal according to the present disclosure may include a main body, a touch screen disposed on a front side of the main body, a first sensor disposed on the front side to sense the approach of an object to the main body in a locked state, a second sensor disposed in proximity to the first sensor to be driven in either one of a sleep mode and an active mode to acquire a vein image of an object that has approached the first sensor in the active mode, and a controller configured to perform authentication for a legitimate user using the vein image acquired through the second sensor, and control the touch screen to display content related to user privacy when the authentication for the legitimate user is successful, and switch the locked state to an unlocked state when a preset gesture of the object is sensed through the second sensor while the content is displayed, and control the touch screen to display a home screen page.

According to an embodiment, the controller may control the touch screen to end the display of the content when the preset gesture is not sensed for a preset period of time while the content is displayed.

According to an embodiment, the first sensor may maintain a low power active mode driven with power equal to or less than a preset value in the locked state, and sense the approach of the object to the main body while the second sensor is driven in the sleep mode.

According to an embodiment, the second sensor may change a driving mode from the sleep mode to the active mode when an object that has approached the first sensor corresponds to a pre-specified body part.

As described above, according to a mobile terminal in accordance with the present disclosure and a control method thereof, a user's body located in a three-dimensional space may be sensed to authenticate the user's vein, thereby obtaining convenience capable of allowing the user to perform user authentication even when he or she does not directly touch or manipulate the mobile terminal.

Furthermore, according to a mobile terminal in accordance with the present disclosure and a control method thereof, even when the terminal is in a standby state, a locked state, or a touch screen is off, it may be possible to recognize a user approaching the terminal using a specific sensor, and execute a process for vein authentication based on the user being authenticated. Accordingly, the user may perform vein authentication without directly manipulating the terminal.

In addition, according to a mobile terminal in accordance with the present disclosure and a control method thereof, it may be possible to recognize whether a user's body part approaching the terminal is a body part suitable for vein authentication, and activate a vein authentication sensor based on the result. Accordingly, in the present disclosure, the vein authentication sensor for vein authentication may not be continuously activated, but activated only when a body part suitable for vein authentication is sensed, and as a result, unnecessary power consumption may be reduced.

Moreover, according to a mobile terminal in accordance with the present disclosure and a control method thereof, an unlocking process may be divided into a plurality of steps to accurately know a user's intention to use the terminal. Accordingly, when a user approaches the terminal with no intention to use the terminal, it may be possible to prevent the terminal from being unlocked unnecessarily.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIGS. 2A and 2B are conceptual views illustrating sensors used to perform vein authentication in the present disclosure;

FIG. 3 is a flowchart for explaining a vein authentication method according to the present disclosure;

FIGS. 4 and 5 are conceptual views illustrating a vein authentication process according to the present disclosure;

FIGS. 6, 7A, 7B, 7C, and 8 are conceptual views illustrating information displayed on a touch screen through a vein authentication process according to the present disclosure;

FIGS. 12A, 12B, 12C and 12D are conceptual views for explaining a method of guiding a sensing area in a vein authentication sensor according to the present disclosure; and FIGS. 13, 14, 15, 16, and 17 are conceptual views illustrating a method of controlling a mobile terminal in the mobile terminal according to the present disclosure.

DETAILED DESCRIPTION OF THE INVENTION

Figure 1A:
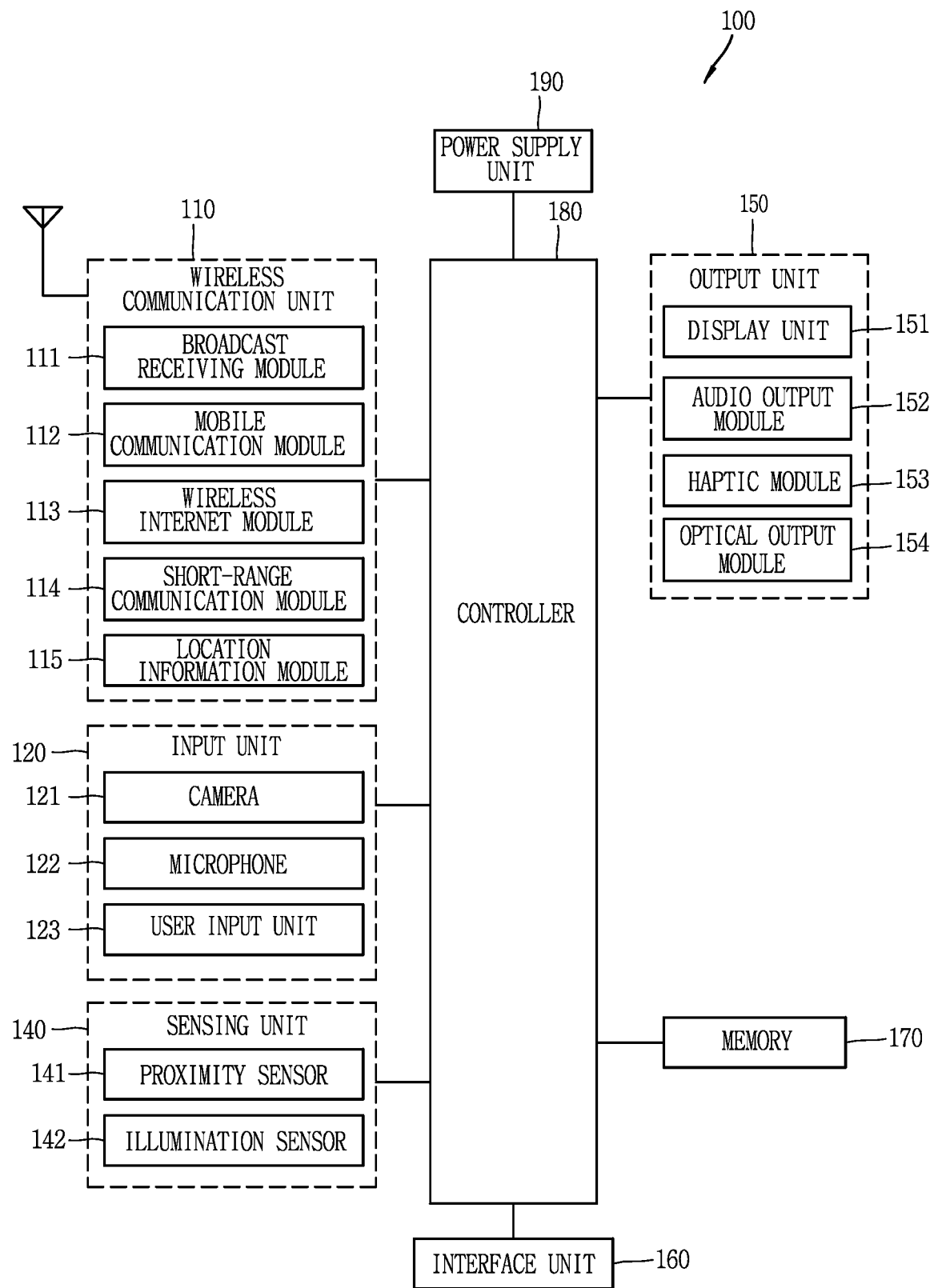
FIG. 1A is a block diagram for explaining a mobile terminal associated with the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
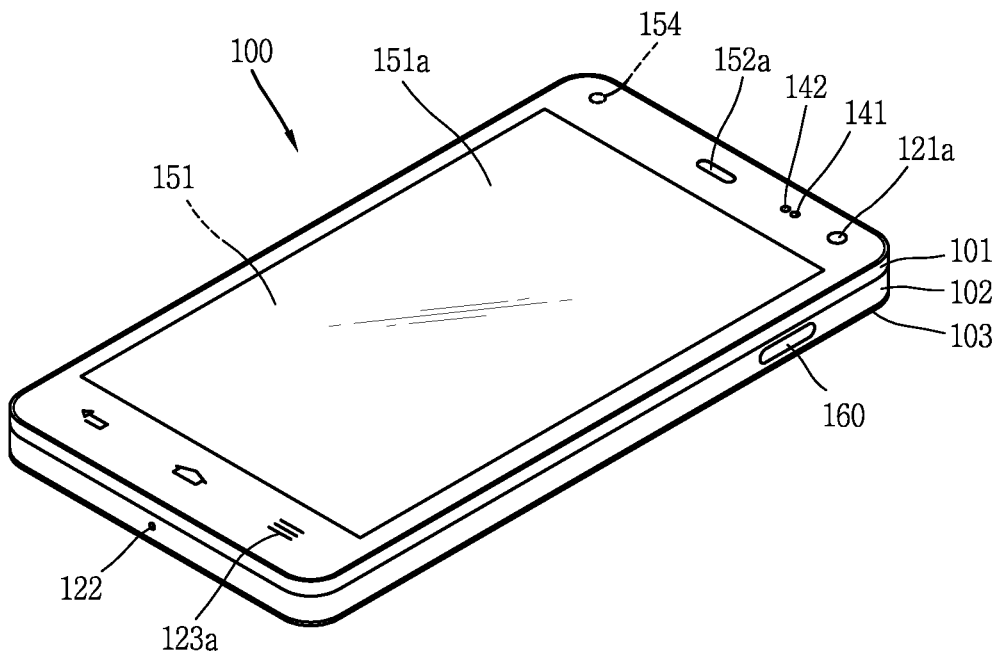
FIGS. 1B and 1C are conceptual views illustrating an example in which a mobile terminal associated with the present disclosure is seen from different directions.
Figure 1C:
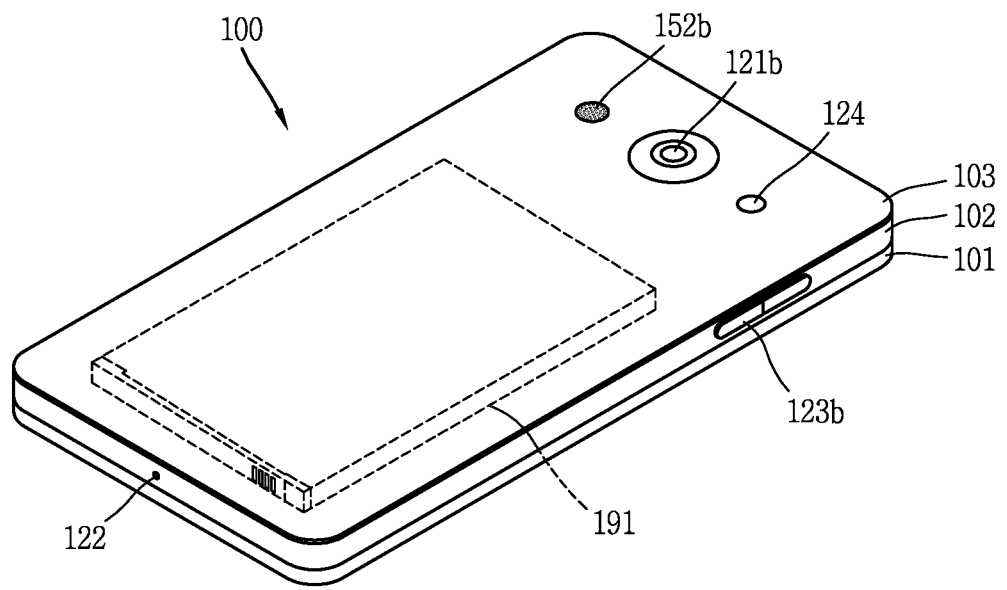

Referring to FIGS. 1A through 1C, FIG. 1A is a block diagram for explaining a mobile terminal associated with the present disclosure, and FIGS. 1B and 1C are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 serves as an interface with various types of external devices that can be coupled to the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to link data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio signal, the mobile terminal 100 may include one or a plurality of cameras 121. The camera 121 processes an image frame, such as still picture or video, acquired by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

On the other hand, the camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be ended as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the electronic device 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

Meanwhile, as aforementioned, the controller 180 may typically control the general operations of the mobile terminal 100. For example, the controller 180 may execute or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this case, a mobile terminal 100 having a uni-body formed in such a manner that synthetic resin or metal extends from a side surface to a rear surface may also be implemented.

On the other hand, the mobile terminal 100 may include a waterproofing unit for preventing an introduction of water into the terminal body. For example, the waterproof portion may include a waterproof member provided between the window 151a and the front case 101, between the front case 101 and the rear case 102, or between the rear case 102 and the back cover 103, to hermetically seal an inner space when those cases are coupled to each other.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, the foregoing configuration may not be necessarily limited to the arrangement. The foregoing configuration may be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Furthermore, the display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

Meanwhile, the touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

As described above, the display unit 151 may form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121a may process video frames such as still or moving images acquired by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap with the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may link with the display unit 151 to extend the function of the mobile terminal 100. Another example of the accessory may be a touch pen for assisting or extending a touch input onto a touch screen.

On the other hand, the mobile terminal according to the present disclosure may be provided with at least one sensor capable of sensing a user's biometric information, and may include a sensor capable of sensing the user's vein from the user's biometric information.

Hereinafter, a method of sensing a user's vein to perform user authentication will be described in detail with reference to the accompanying drawings. FIGS. 2A and 2B are conceptual views illustrating sensors used to perform vein authentication in the present disclosure.

As illustrated in (a) of FIG. 2A, the mobile terminal may include a first sensor 300 configured to sense the approach of an object to the terminal body and a second sensor 200 configured to acquire a vein image of the object.

As illustrated in the drawing, the first sensor 300 and the second sensor 200 may be disposed on a front side of the main body. Furthermore, although not shown, the first sensor 300 and the second sensor 200 may be disposed on another side of the main body. The first sensor 300 and the second sensor 200 are provided to sense an object approaching the terminal body and a vein thereof, and at least a part of the sensing area overlaps with each other. Therefore, the first sensor 300 and the second sensor 200 may be disposed on the same side of the terminal body.

As illustrated in (a) of FIG. 2A, the first and second sensors 300, 200 may be disposed on a front side of the main body disposed with the touch screen 151. As illustrated in the drawing, the first and second sensors 300, 200 may be disposed on one side of the touch screen 151.

The first and second sensors 300, 200 may be disposed in proximity to the touch screen 151. Accordingly, in the present disclosure, it may be possible to more efficiently sense the approach of a user who wants to use the touch screen 151.

In the present disclosure, the first sensor 300 may sense the approach of an object. Here, the object may be a user's body part. For example, the object may be any part of a body such as a palm, a back of hand, a wrist, and a face.

The first sensor 300 may sense an object in the sensing area of the first sensor 300, and the sensing area may be defined as a three-dimensional space.

Accordingly, the first sensor 300 may sense an object located in the vicinity of the terminal, even when the object is not in contact with the terminal.

In the present disclosure, the first sensor 300 may operate in an active state at preset time intervals or in real time when the terminal is in a standby state, a locked state or a sleep mode. Accordingly, an object approaching the terminal body may be sensed at any time.

The first sensor 300 may be driven in a low power active mode in which the terminal is driven in a standby state, a locked state or in a sleep mode with power lower than a preset value.

The standby state, locked state or sleep mode in the terminal may be a state in which information is not displayed or only minimum information is displayed on the touch screen 151 of the terminal.

Here, the state in which only minimum information is displayed on the touch screen may be referred to as an Always On Disable (AOD) mode. In the AOD mode, information such as time information, battery information, and information on an icon of an application in which an event has occurred may be displayed.

Meanwhile, in the present disclosure, information allowed to access only for a legitimate user is displayed by performing user authentication using the first and second sensors, and thus it is assumed that the state of the terminal is in a locked state until user authentication is carried out.

Here, the locked state is a state requiring an additional input for unlocking the locked state set in the terminal, and the terminal may be switch from a locked state to an unlocked state only when preset information is input or sensed.

In the locked state, the first sensor 300 may be operated (driven) in the active mode to sense an object approaching the terminal body.

While the first sensor 300 operates in an active mode, the second sensor 200 may be driven in either one of an active mode or an inactive (or sleep) mode.

More specifically, the second sensor 200 may be driven in a sleep mode until an object is sensed in the first sensor 300. Furthermore, when the object is sensed by the first sensor 300, it is switched from a sleep mode to an active mode, and may be driven in the active mode.

Here, the first sensor 300 may be driven by a separate processor, and the driving of the first sensor 300 may not affect the driving of the second sensor 200.

The processor for driving the first sensor 300 and the processor for driving the second sensor 200 may be different processors.

Therefore, even when the first sensor 300 is driven in an active state, the second sensor 200 does not always need to operate in an active mode, and its driving mode may be switched from a sleep mode to an active mode only when a specific event occurs in the first sensor 300.

Here, a specific event occurs in the first sensor 300 when an object is sensed. Accordingly, the second sensor 200 may be driven in an active mode when an object approaching the terminal body is sensed through the first sensor 300.

Here, the specific event may occur in the first sensor 300 only when an object is sensed.

For another example, the specific event may occur only when a pre-specified body part is sensed through the first sensor 300.

For example, in the case where the pre-specified body part is a "palm," as illustrated in (b) of FIG. 2A, the first sensor 300 may determine whether the object corresponds to a "palm" in response to the approach of an object to the terminal body.

Furthermore, the first sensor 300 may generate an active event signal for changing the operation mode of the second sensor 200 when an object 1000 approaching the terminal body corresponds to a palm. In other words, an active event occurs.

The second sensor 200 being driven in a sleep mode may be changed from an operation mode to an active mode in response to the occurrence of the active event.

Meanwhile, the first sensor 300 may continuously maintain the active mode while the second sensor 200 is driven in the active mode. In another case, while the second sensor 200 is driven in an active mode, the first sensor 300 may be driven in a sleep mode.

Meanwhile, the first sensor 300 may be an illuminance sensor provided in the terminal. In this case, the first sensor 300 can sense whether or not an object has approached the terminal body.

Moreover, the first sensor 300 according to the present disclosure may be configured to sense an object in front on which the first sensor 300 is disposed.

Moreover, the first sensor 300 according to the present disclosure may be configured to determine a material (substance) of the object. Accordingly, it may be possible to determine a material of which the object is made of a human body, a metal, a plastic or the like.

Moreover, the first sensor 300 may be configured to sense the shape of the object. Therefore, the first sensor 300 may determine whether the object corresponds to a pre-specified body part.

At this time, the first sensor 300 may be implemented by any one of a radar sensor, an ultrasonic sensor, and an image sensor.

As described above, when the approach of an object is sensed through the first sensor 300, the second sensor 200 may sense a vein of the object.

More specifically, the second sensor 200 may acquire a vein image of the object. The controller 180 may determine whether it matches or corresponds to pre-registered vein information using the vein image acquired through the second sensor 200.

A time point when the second sensor 200 changes from a sleep mode to an active mode may vary depending on which information of the object can be sensed by the first sensor 300.

For an example, when the first sensor 300 is a sensor capable of sensing only the approach of an object, the second sensor 200 may be switched to an active mode to sense a vein of the object if the approach of the object is sensed in the first sensor 300. In this case, when the object is not a human body, the vein may not be sensed.

For another example, when the first sensor 300 is a sensor capable of sensing the material of the object, the second sensor 200 may be driven in an active mode only when a human body is sensed through the first sensor 300. In this case, the second sensor 200 may sense a vein contained in the human body.

For still another example, when the first sensor 300 is a sensor capable of sensing not only the material of the object but also the shape of the object, the first sensor 300 may generate an active event signal only when the object corresponds to a pre-specified (pre-registered) body part. In this case, the second sensor 200 is driven in an active mode only when a pre-specified body part is sensed in the first sensor 300, and may acquire a vein image for the pre-specified body part.

Meanwhile, the second sensor 200 according to the present disclosure is configured to sense a vein of an object. The second sensor 200 may also be referred to as a vein sensor.

More specifically, the second sensor 200 may include an infrared light emitting unit 210 that emits light including an infrared region wavelength.

Moreover, the second sensor 200 may include a depth sensing unit 220 configured to receive light emitted from the infrared light emitting unit 210 and reflected from the object located in the sensing area of the second sensor 200, and acquire the vein image based on the arrival time of the received light.

Here, the sensing area 250 (see (b) of FIG. 2A) of the second sensor 200 may be a three-dimensional space defined within a preset distance and angular range based on an area disposed with the second sensor in the main body. The sensing area may be expressed as ROI (Region of Interest).

The depth sensing unit 220 may calculate a distance value of the object 1000 based on the information of light emitted from the infrared light emitting unit 210 and arrived at the depth sensing unit 220.

More specifically, the depth sensing unit 220 measures a flight time of light from the infrared light emitting unit 210 to the depth sensing unit to calculate a distance value.

Moreover, as illustrated in FIG. 2B, when the object 1000 is a body part, a vein 1010 contained in the object 1000 absorbs light in an infrared wavelength region, particularly, a near-infrared (NIR) wavelength region. Accordingly, when light emitted from the infrared light emitting unit 210 and arrived at the object 1000 is in a infrared wavelength region, a substantial region of the vein 1010 is absorbed and not reflected, and a region other than the vein 1010 is hardly absorbed and reflected.

Meanwhile, light reflected on the object 1000 reaches the depth sensing unit 220 performing the role of an image sensor. In other words, the reflected light forms an image on the depth sensing unit 220 to form a vein image.

As illustrated in the drawing, a region other than the vein 1010 has a high reflectance, and thus forms a bright portion image 2020 on the vein image 2000, and a portion corresponding to the vein 1010 forms a dark portion image 2010.

The dark portion image 2010 corresponds to a vein of the object, and forms a different shape and pattern for each user.

Therefore, the controller 1800 may authenticate a user using the dark portion image 2010. The dark portion image 2010 may also be expressed as a vein pattern.

On the other hand, the second sensor 200 may acquire a distance value to the object 1000 based on the second sensor 200 and a vein image.

Accordingly, the controller 180 may control user authentication and various functions of the terminal using at least one of the distance value and the vein image.

Here, the second sensor 200 may be a ToF (Time of Flight) sensor. The ToF sensor is able to set a sensing area for sensing an object, and in particular, a sensing distance may be set based on the ToF sensor. Accordingly, the second sensor 200 may use only the information of an object included within the sensing distance as user authentication information.

For example, the sensing distance may be set to 10-30 cm from the ToF sensor. In this case, the second sensor 200 may use only the data of an object located within 10-30 cm from the ToF sensor.

On the other hand, in addition to the ToF sensor, the second sensor may be another type of sensor, and may be implemented in a stereo camera mode, a structured light mode, a general camera mode, or the like.

As described above, according to the present disclosure, a user's vein may be authenticated using the first and second sensors, and when the user's vein is authenticated, a locked state may be switched to an unlocked state to provide useful information to the user.

In particular, in the present disclosure, the second sensor 200 is driven in an active mode only when the approach of the object is sensed through the first sensor 300, thereby preventing the second sensor 200 from being unnecessarily driven in an active mode.

Hereinafter, a method of authenticating a user and a method of releasing a locked state using the first and second sensors 300 and 200 will be described in detail with reference to the accompanying drawings. FIG. 3 is a flowchart for explaining a vein authentication method according to the present disclosure, and FIGS. 4 and 5 are conceptual views illustrating a vein authentication process according to the present disclosure.

In the following description, a process of switching from a locked state to an unlocked state through vein authentication in the locked state will be described.

Here, the locked state is a state requiring an additional input for unlocking the locked state set in the terminal, and the terminal may be switch from a locked state to an unlocked state only when preset information is input or sensed.

In the locked state, the touch screen of the terminal may operate in either one of an active state or an inactive state. Here, the inactive state includes a state in which no information is displayed on the touch screen, and a case in which the AOD mode is operated.

In the mobile terminal according to the present disclosure, the process of sensing the approach of an object to the main body proceeds in a locked state is carried out (S310).

The mobile terminal according to the present disclosure includes the first sensor 300 for sensing the approach of an object to the main body, and the process S310 denotes a process for sensing an object by the first sensor 300.

Hereinafter, the description of the first sensor will be substituted by the description with reference to FIGS. 2A and 2B.

As illustrated in FIG. 5, the first sensor 300 may sense the object 1000 approaching the terminal body 100.

At this time, the first sensor 300 may generate an active event signal based on the sensing of the object 1000.

Here, the active event may occur in the first sensor 300 only when an object is sensed.

For another example, the active event may occur only when the object is a human body.

For still another example, the specific event may occur only when a pre-specified body part is sensed through the first sensor 300.

Hereinafter, the active event will be described by specifying a case where an object is sensed as a preset body part through the first sensor 300. The present disclosure may be applicable in a similar manner to the other two examples described above.

When the pre-specified body part is a "palm", the first sensor 300 may determine whether the object corresponds to a "palm" in response to the approach of an object to the terminal body. Furthermore, the first sensor 300 may generate an active event signal for changing the operation mode of the second sensor 200 when an object 1000 approaching the terminal body corresponds to a palm. In other words, an active event occurs.

The first sensor 300 may sense the material, shape, and the like, of the object 1000, and generate an active event signal only when the object 1000 corresponds to a pre-specified (or pre-registered) body part based on the sensing information.

As illustrated in (b) of FIG. 5, the first sensor 300 may sense the shape of the object, and when the shape corresponds to the shape of the pre-specified body part, the first sensor 300 may generate an active event signal for driving the second sensor 200 in an activate mode.

In the present disclosure, whether or not to activate the second sensor when a body part is sensed may be specified by the user's selection.

Furthermore, whether or not to activate the second sensor when a body part is sensed may also be determined under the control of the controller 180.

The second sensor 200 may be driven in either one of the sleep mode or the active mode depending on whether the object is a pre-specified body part in the locked state.

While the process S310 is carried out, the second sensor 200 may be driven in a sleep mode. In this case, the second sensor 200 may be in a state in which not being supplied with operating power or a state being supplied with only minimum operating power.

On the other hand, when an object approaching the first sensor 300 does not correspond to the pre-specified body part, the second sensor 200 may be continuously driven in a sleep mode.

When the object does not satisfy an active event generation condition for activating the second sensor, even if the object approaches the first sensor 300, the active event may not be generated, and as a result, the second sensor 200 may continuously maintain the sleep mode.

On the other hand, even when a pre-specified body part is sensed by the first sensor 300, and the second sensor 200 is in an active state, the locked state may be continuously maintained.

When the object is sensed through the first sensor, 300 and the object corresponds to a pre-specified body part, the second sensor 200 may sense a vein contained in the pre-specified body part. While the vein is being sensed through the second sensor 200, the state of the terminal may be in a locked state.

In other words, when the process S310 is completed, the process of acquiring a vein image of an object approaching the first sensor 300 is carried out (S320).

As described above, the second sensor 200 is driven in either one of a sleep mode or an active mode. The second sensor 200 that has been driven in a sleep mode may be driven in an active mode in response to an active event previously described the process S310.

Even when the second sensor 200 is driven in an active mode, the locked state may be continuously maintained. The second sensor 200 acquires a vein image 510 of an object approaching the first sensor in the activation mode.

The controller 180 may continuously maintain the locked state while the vein image of the pre-specified body part is acquired through the second sensor 200 operating in the active mode.

The second sensor 200 may also be referred to as a vein sensor. The second sensor 200 may include an infrared light emitting unit 210 that emits light including an infrared region wavelength. Moreover, the second sensor 200 may include a depth sensing unit 220 configured to receive light emitted from the infrared light emitting unit 210 and reflected from the object located in the sensing area of the second sensor 200, and acquire the vein image based on the arrival time of the received light.

As illustrated in (c) of FIG. 5, since a region other than the vein has a high reflectance so as to form a bright portion image 502 in a vein image 510, and a portion corresponding to the vein may form a dark portion image 503.

The dark portion image 503 corresponds to a vein of the object, and forms a different shape and pattern for each user.

On the other hand, as illustrated in FIG. 4, the sensing area of the second sensor 200 may be a three-dimensional space 250 defined within a preset distance (D1) and an angular range based on an area disposed with the second sensor 200 in the main body. The sensing area 250 may be expressed as ROI (Region of Interest).

The depth sensing unit 220 may calculate a distance value of the object 1000 based on time information of light emitted to an object located in the sensing area 250 up to the sensing unit 220 through the infrared light emitting unit 210.

More specifically, the depth sensing unit 220 measures a flight time of light from the infrared light emitting unit 210 to the depth sensing unit to calculate a distance value.

The second sensor 200 may sense a vein contained in an object only for the object located within the sensing area 250, as illustrated in (c) of FIG. 4. For example, when the object 1000 is out of at least one of the sensing distance and the angle, as illustrated in (b) or (d) of FIG. 4, sensing may not be carried out.

Furthermore, since the second sensor 200 can sense the arrival time of light reflected from the object 1000, the controller 180 may acquire a relative distance (a, b, c) to the object 1000 based on the terminal body (or a position at which the second sensor 200 is disposed) to perform various controls using the distance.

Meanwhile, when the vein image 510 is acquired through the process S320, a vein authentication process is carried out (S330). In other words, the process of determining whether the vein image 510 acquired through the process S320 matches or corresponds to the pre-registered vein information is carried out.

The controller 180 may determine whether the vein image 500 acquired through the second sensor 200 matches or corresponds to a legitimate user's vein information.

Here, the legitimate user's vein information may be information previously stored in a memory of the terminal or an external server such as a cloud server in advance.

Meanwhile, when the vein authentication process is carried out in the process S330, the process of controlling information displayed on the touch screen (S340) is carried out based on the authentication result. When the vein image 500 corresponds to (or matches) a vein image of a pre-registered user, the controller 180 may control the touch screen to display security information allowed to access for the pre-registered user. At this time, the locked state of the terminal may be switched to an unlocked state.

Furthermore, when a legitimate user is not authenticated, that is, when the acquired vein image 500 does not match the vein information of the pre-registered user, the controller 180 may continuously maintain the terminal in the locked state.

At this time, the controller 180 may control the touch screen to display guide information requesting re-authentication for the user's vein.

In addition, when a legitimate user is not authenticated as a result of the authentication, the controller may switch the operation mode of the second sensor 200 from an active mode to a sleep mode.

At this time, the first sensor 300 may be driven in an active mode to sense the approach of an object to the terminal body.

On the other hand, when vein authentication has been successfully carried, In other words, when authentication for a legitimate user is completed, the controller 180 may control the touch screen 151 to display information provided to the legitimate user on the touch screen 151.

In the present specification, information displayed when vein authentication is successfully carried out may be referred to as "security information."

Here, security information may be any one of a variety of information related to a legitimate user or information provided when the terminal is in an unlocked state.

For example, the security information may be any one of various types of information, such as i) event information generated in the terminal, ii) event information generated in a pre-specified application (e.g., a financial application), iii) a home screen page displayed in an unlocked state, and iv) an execution screen of a specific application.

At this time, which information to be displayed based on the completion of vein authentication may be determined and changed under the control of the user's selection or the controller 180.

As described above, according to a mobile terminal in accordance with the present disclosure and a control method thereof, a user's body located in a three-dimensional space may be sensed to authenticate the user's vein, thereby obtaining convenience capable of allowing the user to perform user authentication even when he or she does not directly touch or manipulate the mobile terminal.

Furthermore, according to a mobile terminal in accordance with the present disclosure and a control method thereof, even when the terminal is in a standby state, a locked state, or a touch screen is off, it may be possible to recognize a user approaching the terminal using a specific sensor, and execute a process for vein authentication based on the user being authenticated. Accordingly, the user may perform vein authentication without directly manipulating the terminal.

On the other hand, in order to drive the second sensor 200 for vein authentication, much power is required. Therefore, in order to solve the problem, in the present disclosure, the second sensor 200 may be activated only when an object subject to vein authentication is sensed using the first sensor 300 driven with low power, thereby saving power for driving the second sensor 200.

As described above, according to the present disclosure, when determined whether an object has approached and the approached object is a pre-specified body part, the second sensor 200 in a sleep mode may be changed to an active mode. In addition, the second sensor 200 may acquire a vein image of a vein included in the pre-specified body part, and the controller may perform authentication on a legitimate user based on the acquired vein image to provide useful information allowed for the legitimate user to access.

Meanwhile, in the present disclosure, when vein authentication is successfully carried out, the types and steps of information to be provided may be modified in various ways, and hereinafter, a method of providing such information will be described in detail with reference to the accompanying drawings.

FIGS. 6, 7A, 7B, 7C, and 8 are conceptual views illustrating information displayed on a touch screen through a vein authentication process according to the present disclosure.

In the following description, it will be described on the assumption that vein authentication has been carried for a legitimate user using the first and second sensors 300, 200 in the above-described manner.

First, as illustrated in (a) of FIG. 6, when the vein authentication of an object located in the sensing area 250 is successfully carried out, the controller 180 may switch a locked state of the terminal to an unlocked state as illustrated in (b) of FIG. 6. The touch screen 151 may be controlled such that the home screen page 610 is displayed on the touch screen 151. In this case, the user may unlock the terminal and enter the home screen page simply by placing his or her body part on the terminal body without direct contact with the terminal.

Here, the home screen page refers to a screen on which an icon of an application installed in the mobile terminal is output, and means a screen that is output as default when the locked state of the terminal is changed to the unlocked state.

On the other hand, when a locked state is switched to an unlocked state through vein authentication, the controller 180 may control the touch screen 151 to display a preset specific home screen page among a plurality of home screen pages.

Here, the specific home screen page may be a home screen page set to be displayed when additional security information is input. The specific home screen page may include an icon of an application associated with a security folder or a user's privacy.

For another example, first, as illustrated in (a) of FIG. 6, when the vein authentication of an object located in the sensing area 250 is successfully carried out, the controller 180 may switch a locked state of the terminal to an unlocked state to display event information as illustrated in (c) of FIG. 6.

Here, the event information may be an event that has occurred in an application installed in the mobile terminal or an event received from the outside.

Since the event information is related to the user's privacy, there is a need to maintain security. Therefore, the controller 180 may display event information only when a legitimate user is authenticated through vein authentication.

Meanwhile, the locked state of the present disclosure may be switched to the completely unlocked state through the first and second unlocking processes, a state in which event information is displayed may be a first unlocked state.

According to the present disclosure, a plurality of unlocking processes may be provided to accurately know a user's intention to use the terminal.

In other words, the user may not want to enter the home screen page, but may want to check for an event that has occurred on the terminal. In addition, the user may not place his or her body part on the terminal to unlock the terminal. As described above, cases where a completely unlocked state of the terminal is not intended may frequently occur, and according to the present disclosure, in order to solve such a problem, the unlocking process of the terminal may be divided into a plurality of processes to know the user's explicit intention.

In other words, the first unlocked state may not be a state in which the locked state of the mobile terminal is completely released. In the present disclosure, a state in which the mobile terminal is completely unlocked may be a state in which the home screen page is displayed, as illustrated in (b) of FIG. 6.

For example, the controller 180 may authenticate a legitimate user using a vein image acquired through the second sensor 200, and when the authentication of the legitimate user is successful as a result of the authentication, the controller 180 may control the touch screen to display content 720 related to user privacy, as illustrated in (b) of FIG. 7. Moreover, when a preset gesture of the object 1000 is sensed through the second sensor while the content 720 is displayed, the controller 180 may control the touch screen to switch the locked state to a completely unlocked state to display a home screen page 730.

Figure 7A:
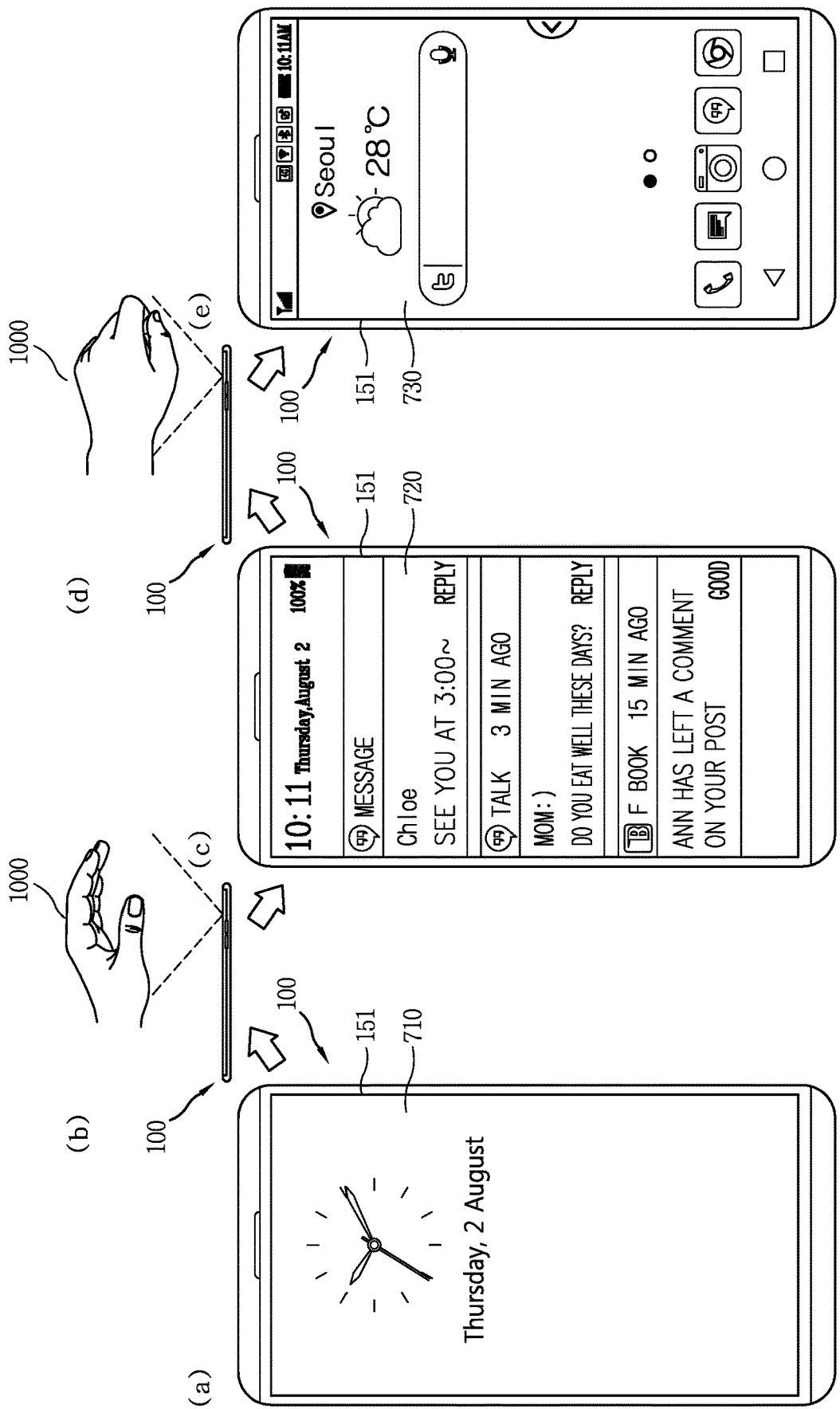

The first unlocking process is a process of determining whether a vein image acquired through the second sensor 200 corresponds to a vein image of a pre-registered user as illustrated in (a) and (b) of FIG. 7A, and when the first unlocking process is successfully authenticated, the mobile terminal may display first security information as illustrated in (c) of FIG. 7A. Here, the first security information may be any one of various types of information, and the foregoing event information is also an example thereof.

On the other hand, subsequent to the completion of the first unlocking process, the controller 180 may sense an additional user input through the second sensor 200.

Here, the additional user input may be a preset gesture of an object. In other words, a second unlocking process may be a process of sensing a preset gesture of the object.

Meanwhile, such a gesture of the object may sense not only by the second sensor 200 but also by the camera mounted on the terminal or the first sensor 300.

More specifically, as illustrated in (d) and (e) of FIG. 7A, when a preset gesture of the object is sensed in the first unlocked state, the controller 180 may control the touch screen to display additional security information, and switch the first unlocked state to a completely unlocked state.

At this time, the additional security information may be a home screen page, as illustrated in (e) of FIG. 7A. On the other hand, a preset gesture of the object is not sensed within the preset period of time in the first unlocked state or the object is out of a sensing area of the second sensor 200 (see FIG. 7C), the controller 180 may switch the first unlocked state back to the locked state. At this time, the touch screen 151 may be switched to an inactive state.

When a preset gesture of the object 1000 is not sensed within a preset period of time after the security information (or first security information) is displayed in the first unlocked state, the controller 180 may control the touch screen to end the displayed of security information. In this case, the user must start again from the vein authentication process.

Meanwhile, as described above, the controller 180 controls the touch screen to display additional security information when a preset gesture of the object is sensed in the first unlocked state, wherein the preset gesture can be defined in various ways according to the user's setting In other words, the user may set a gesture for unlocking through a setting function mounted on the terminal.

Figure 7B:
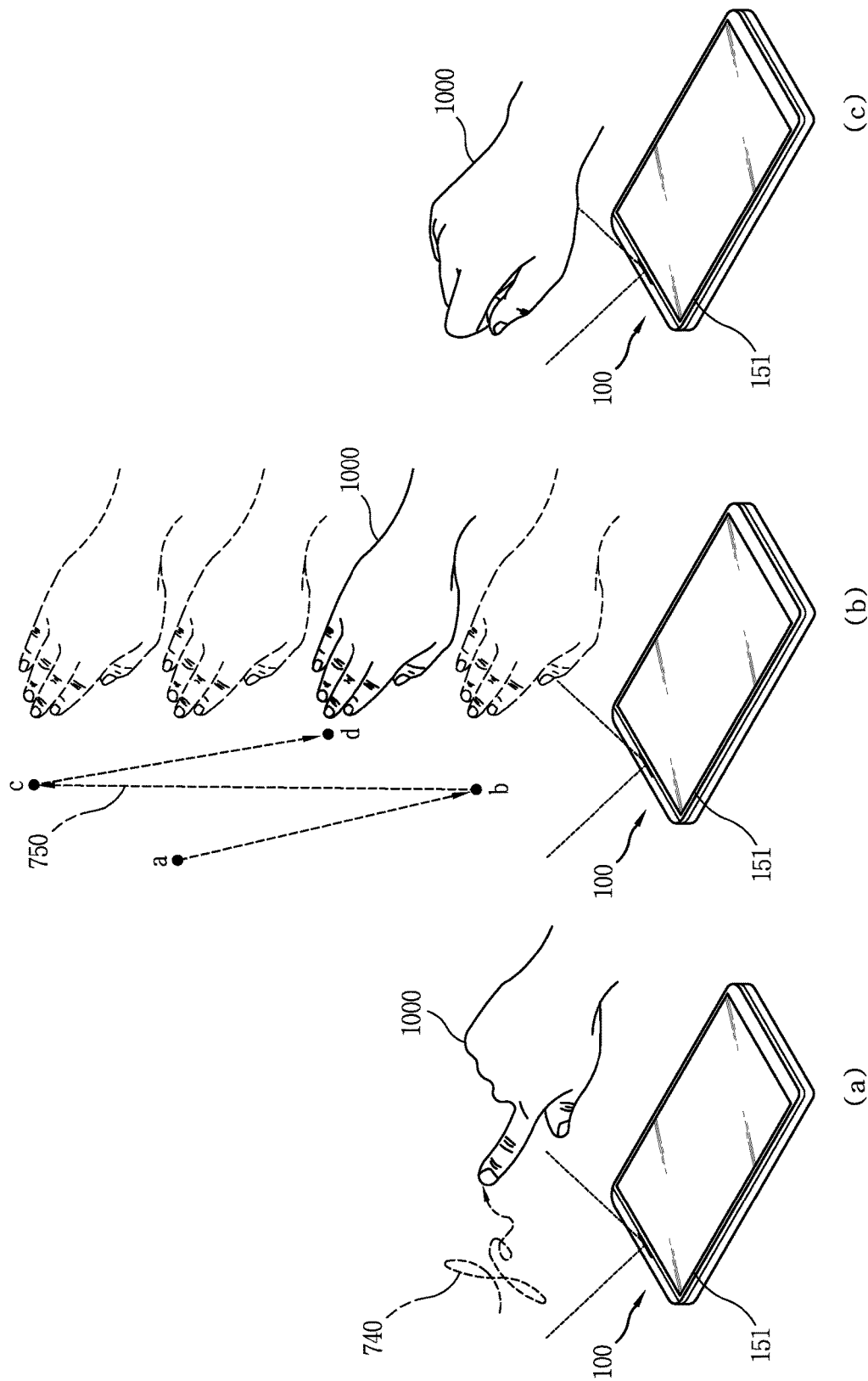
Figure 7C:
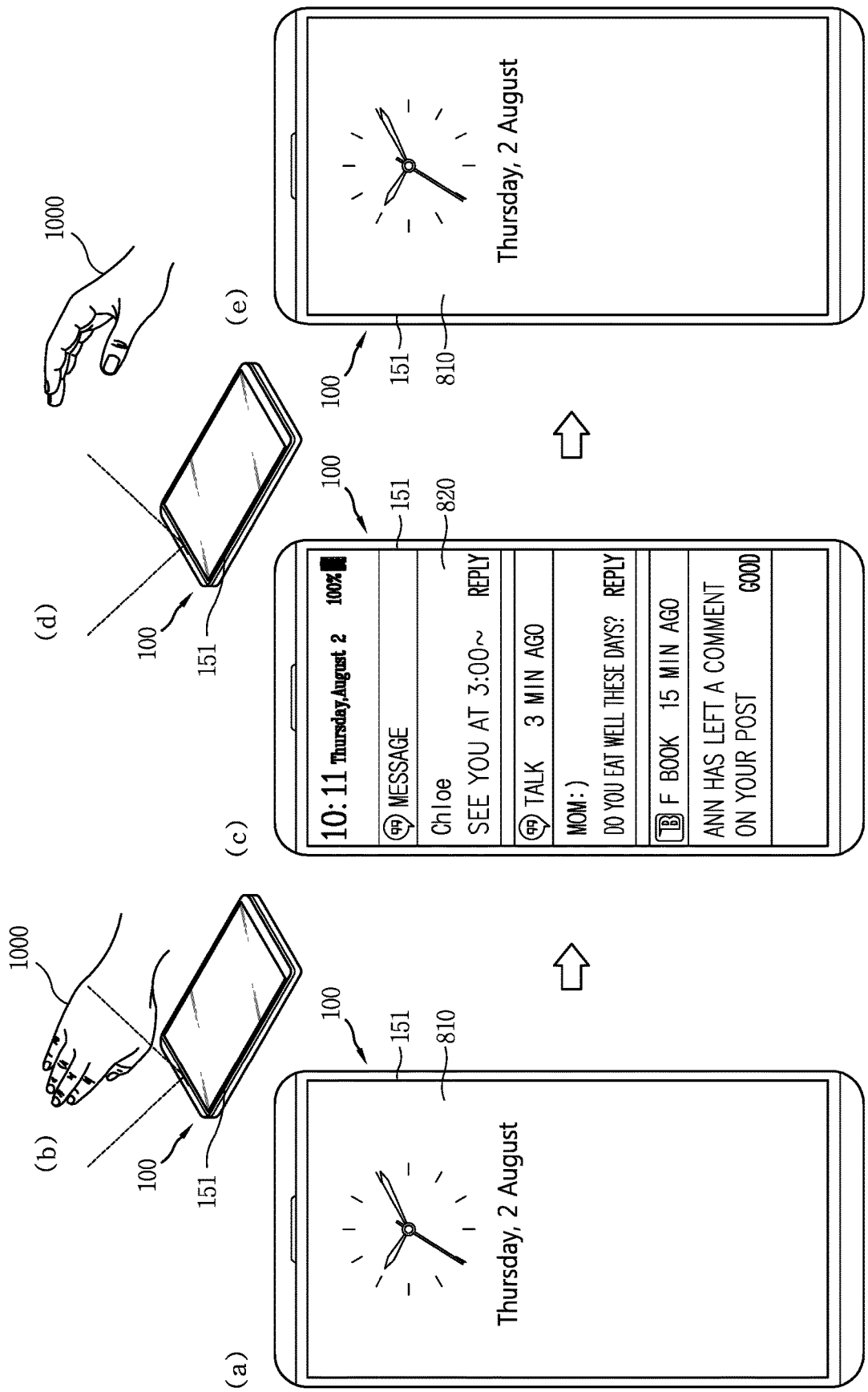

For an example, as illustrated in (a) of FIG. 7B, the preset gesture of the object may be a gesture corresponding to the user's signature 740. The user may register signature information on the terminal in advance. The controller 180 may compare the user's signature information stored in the memory with a gesture of the object, and switch the terminal to a completely unlocked state when the gesture of the object corresponds to or matches the signature information.

For another example, as illustrated in (b) of FIG. 7B, the preset gesture of the object may be a gesture corresponding to a pre-registered height pattern.

In the present disclosure, the second sensor 200 may sense a relative distance of the object based on the terminal body, and thus the controller may know at which height the object is positioned with respect to the terminal body. Using this, the mobile terminal according to the present disclosure may receive height pattern information from the user. For example, as illustrated in FIG. 7B, the user may input a pattern in which the height sequentially changes to points a-b-c-d, and the controller 180 may store the height pattern information. Then, when a preset gesture of the object corresponds to the pre-stored height pattern information in the first unlocked state, the terminal may be switched to a completely unlocked state.

For another example, as illustrated in (c) of FIG. 7B, the preset gesture of the object may be a pre-registered specific motion. For example, as illustrated in the drawing, the pre-registered specific motion may be a hand-cupping motion.

The controller 180 may switch the terminal to a completely unlocked state when the pre-registered specific motion is sensed.

As described above, in the present disclosure, the second sensor 200 may sense a relative distance of the object based on the terminal body, and thus the controller may know at which height the object 1000 is positioned with respect to the terminal body. As a result, according to the present disclosure, the touch screen 151 may be controlled to display different information according to a relative distance between the mobile terminal and the object.

At this time, according to a height at which a preset gesture as shown above in FIGS. 7A and 7B is made, information matching the height to which the preset gesture is applied may be displayed while switching a first unlocked state to a completely unlocked state.

Furthermore, in description illustrated in (b) of FIG. 6, the controller 180 may control the touch screen to switch a locked state to an unlocked state and display different information depending on a height at which vein authentication is carried out.

In the present disclosure, a plurality of information (or security information) that are displayable in an unlocked state may exist in page units.

Here, the information in page units may be home screen page information, information corresponding to a personal mode, and information corresponding to a security folder. On the other hand, the information in page units may be configured in various ways based on the user's setting.

The controller 180 may control the touch screen 151 to display information corresponding to any one of the plurality of pages based on a relative distance between the main body and the object 100 sensed through the depth sensing unit 210 of the second sensor 200.

For example, as illustrated in (a) of FIG. 8, when the object 1000 is sensed in a height range of "a," the controller 180 may display information on a first page 760 of the plurality of pages. Here, the first page 760 may be any one of home screen pages.

For another example, as illustrated in (b) of FIG. 8, when the object 1000 is sensed in a height range of "b," the controller 180 may display information on a second page 770 of the plurality of pages. Here, the second page 770 may be a page in which information related to a user's personal information are collected, as information on a personal mode. The type of information displayed in a personal mode may be determined based on the user's selection.

For still another example, as illustrated in (c) of FIG. 8, when the object 1000 is sensed in a height range of "c," the controller 180 may display information on a third page 780 of the plurality of pages. Here, the third page 780 may be a page including information on a secure folder.

Here, the security folder may be a folder in which a legitimate user is allowed to access, and denote a folder in which contents (applications, memos, data, etc.) that can be accessed are collected only when pre-registered authentication information must be input.

On the other hand, whether information corresponding to which page in which height range (a, b, c) is displayed may be determined based on the user's selection.

Moreover, the controller 180 may display guide information on the displayed page on the touch screen 151 in response to a current height of the object. At this time, as the height of the object changes, the displayed page also changes, and accordingly, the displayed guide information also changes. The guide information may be composed of a thumbnail image.

As described above, according to a mobile terminal in accordance with the present disclosure and a control method thereof, an unlocking process may be divided into a plurality of steps to accurately know a user's intention to use the terminal. Accordingly, when a user approaches the terminal with no intention to use the terminal, it may be possible to prevent the terminal from being unlocked unnecessarily.

In the above embodiment, a method of switching a locked state of the terminal to a completely unlocked state has been described.

The mobile terminal according to the present disclosure, in the foregoing first unlocked state, may control information displayed on the touch screen or perform a specific function based on the user's gesture (or a gesture of the object).

Hereinafter, with reference to the accompanying drawings, a method of controlling a terminal using a user's gesture (or a gesture of an object) in a first unlocked state will be described in detail. FIGS. 9A, 9B, 10 and 11 are conceptual views for explaining a method of controlling a mobile terminal using a vein authentication sensor according to the present disclosure.

Figure 9A:
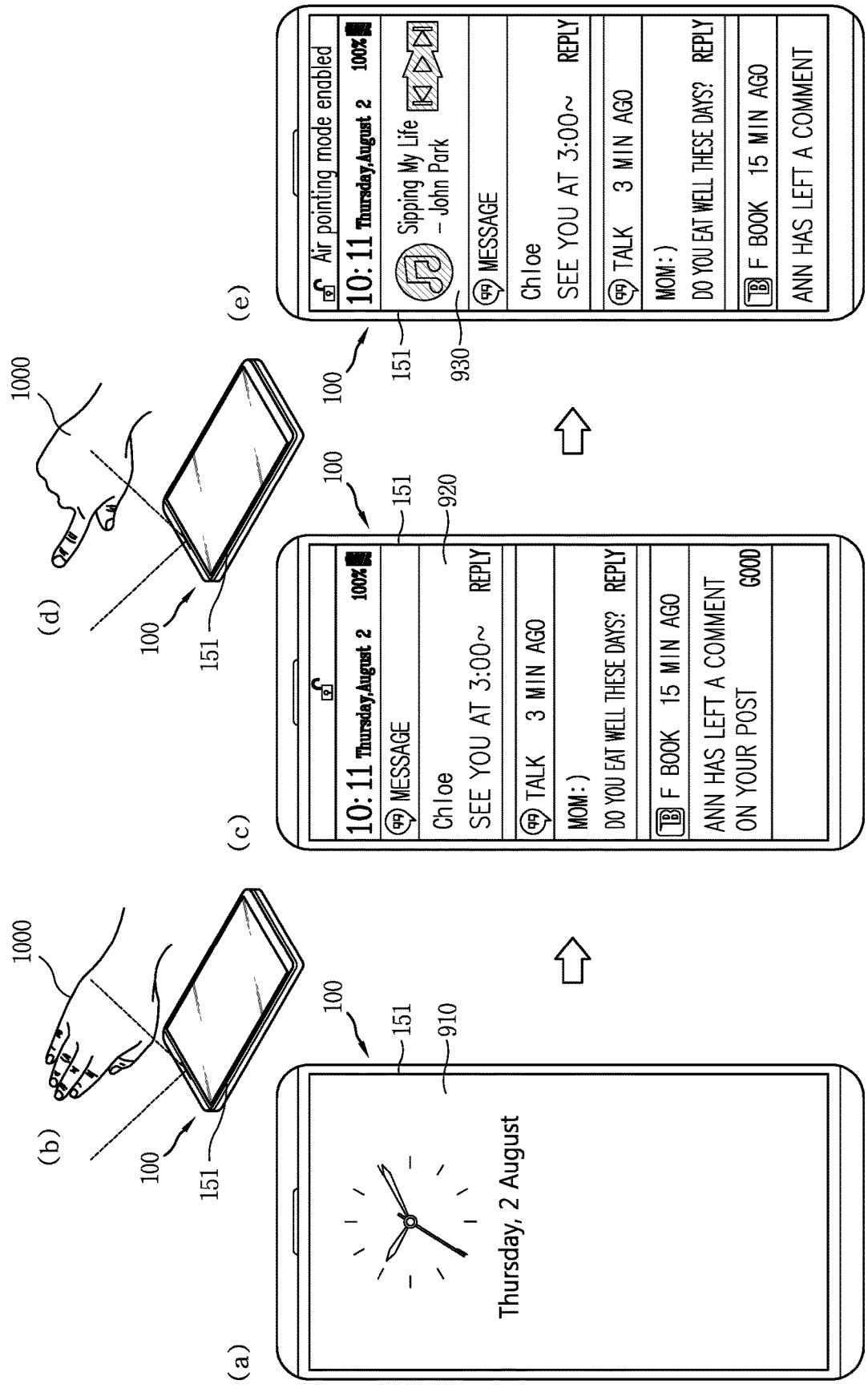
FIGS. 9A, 9B, 10 and 11 are conceptual views for explaining a method of controlling a mobile terminal using a vein authentication sensor according to the present disclosure.

As illustrated in (a) and (b) of FIG. 9A, when the vein authentication of an object located in the sensing area 250 is successfully carried out, the controller 180 of the mobile terminal according to the present disclosure may switch a locked state of the terminal to an unlocked state (or a first unlocked state) and display security information (or primary security information, 920) as illustrated in (c) of FIG. 9A.

When a preset gesture of an object is sensed through the second sensor 200 as illustrated in (d) of FIG. 9A, the controller 180 may process the preset gesture as a command for selecting at least part of information displayed on the touch screen 151.

Here, the preset gesture may be a gesture set as a command for selecting information displayed on the touch screen 151.

For example, security information includes at least one content related to at least one application, and when the preset gesture is sensed, the controller 180 may perform control related to specific content displayed in an area corresponding to a place where the object is located among the at least one content.

When the preset gesture is sensed, in addition to the security information (or primary security information), the controller 180 may additionally display at least one control icon 930 related to an application (for example, a music application) that is controllable in a first unlocked state.

Figure 9B:
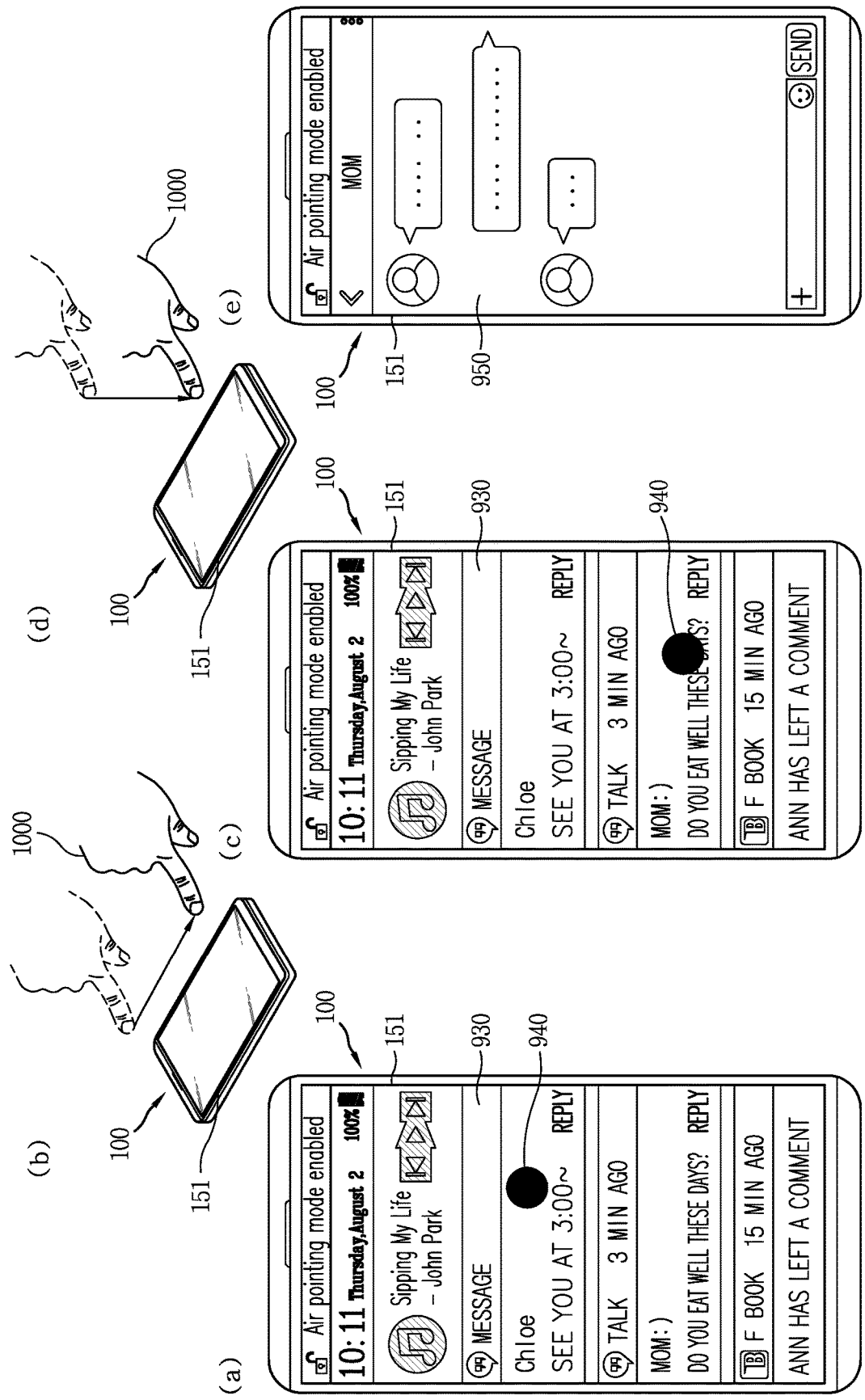

On the other hand, when the preset gesture is sensed, as illustrated in (a) of FIG. 9B, the controller 180 may display a graphic object 940 for guiding which information on the touch screen 151 is indicated by the gesture of the object.

Accordingly, the user may recognize which part of the touch screen 151 is indicated by the object through a position where the graphic object 940 is displayed.

Such a graphic object 940 may be moved on the touch screen 151 as the object moves, as illustrated in (b) and (c) of FIG. 9B.

On the other hand, content displayed on the touch screen 151 may be selected based on another preset gesture of the object. For example, as shown in (d) of FIG. 9B, when the object takes an operation of seemingly pressing a button in a sensing area, the controller 180 may process it as a command for selecting specific content.

For example, the controller 180 may select content being displayed in an area where the graphic object 940 is located, as illustrated in (c) of FIG. 9B, based on the another preset gesture, and as a result, an execution screen 950 corresponding to the content may be displayed on the touch screen or a function may be executed.

At this time, since the terminal has completed vein authentication, the execution screen or an execution screen corresponding to the function may be displayed in an unlocked state (or a completely unlocked state).

Figure 10:
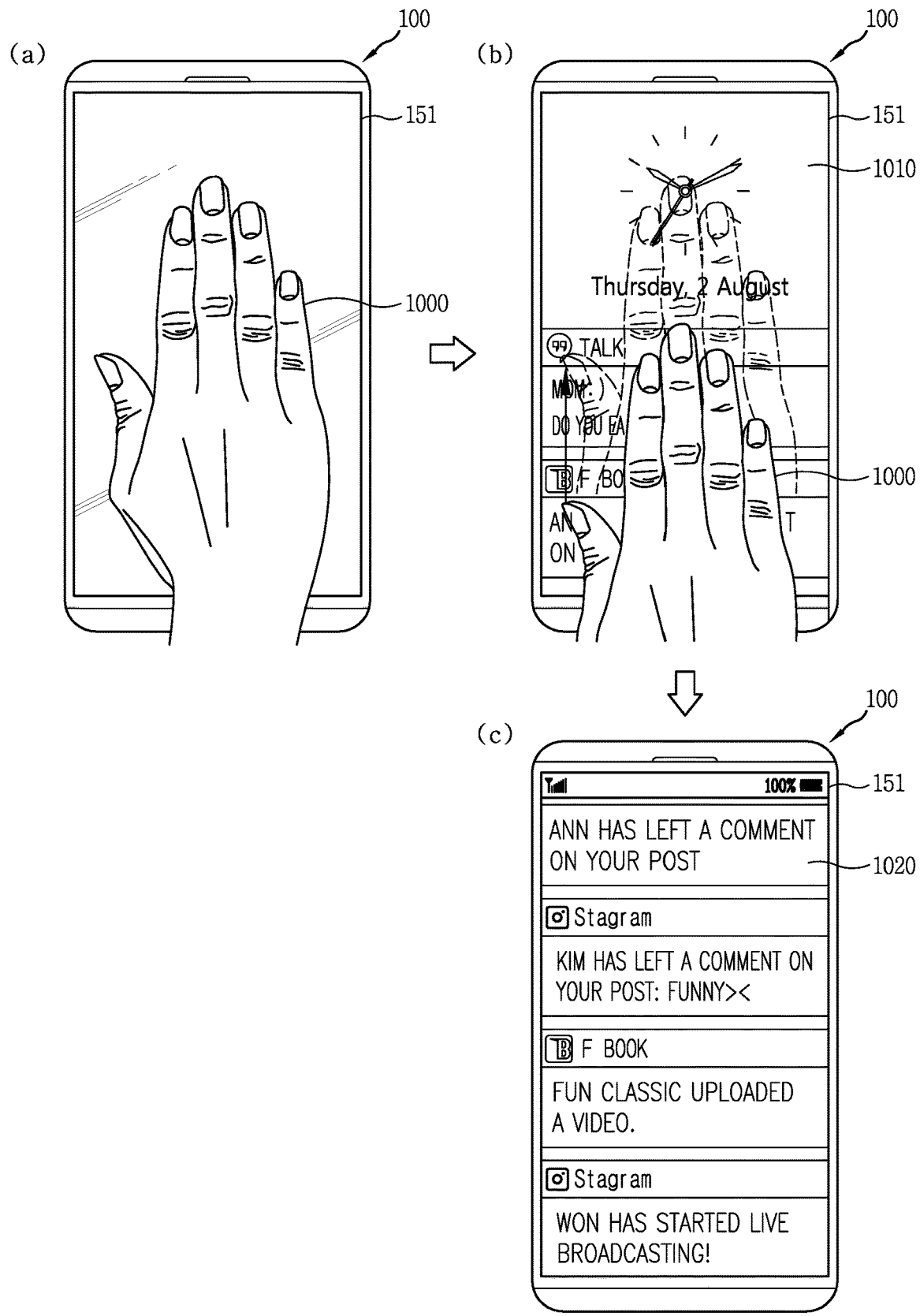

For another example, as illustrated in (a) and (b) of FIG. 10, when the vein authentication of an object is successfully carried out through the first and second sensors 300, 200, the controller 180 of the mobile terminal according to the present disclosure may switch a locked state of the terminal to an unlocked state (or a first unlocked state) and display security information (or primary security information, 1010) as illustrated in (b) of FIG. 10.

Furthermore, the controller 180 may perform control related to at least part of the security information based on the movement of the object located in the sensing area in a state in which the security information is displayed.

The second sensor 200 may sense the location movement of the object, and when there is a movement of the object, the controller may compare a current location of the object with a location prior to the movement to recognize a movement direction of the object.

In the present disclosure, different control commands may be set according to the movement direction of the object. For example, as illustrated in (b) and (c) of FIG. 10, an upward and downward movement of the object may be processed as a command for scrolling information displayed on the touch screen. Accordingly, when it is sensed that the object 1000 moves based on a length direction of the terminal, the controller 180 may scroll information displayed on the touch screen.

For another example, as illustrated in FIGS. 11B and 11C, a left and right movement of the object may be processed as a command for switching information displayed on the touch screen. Accordingly, when it is sensed that the object 1000 moves based on a width direction of the terminal, the controller 180 may switch information displayed on the touch screen to another information. Here, the switching of information, as information switching in page units, may display information of a page other than a page containing currently displayed information.

In the present disclosure, in a first unlocked state, any one of a plurality of pages may be displayed, wherein the plurality of pages may be pages allowed to be displayed in the first locked state.

Figure 11:
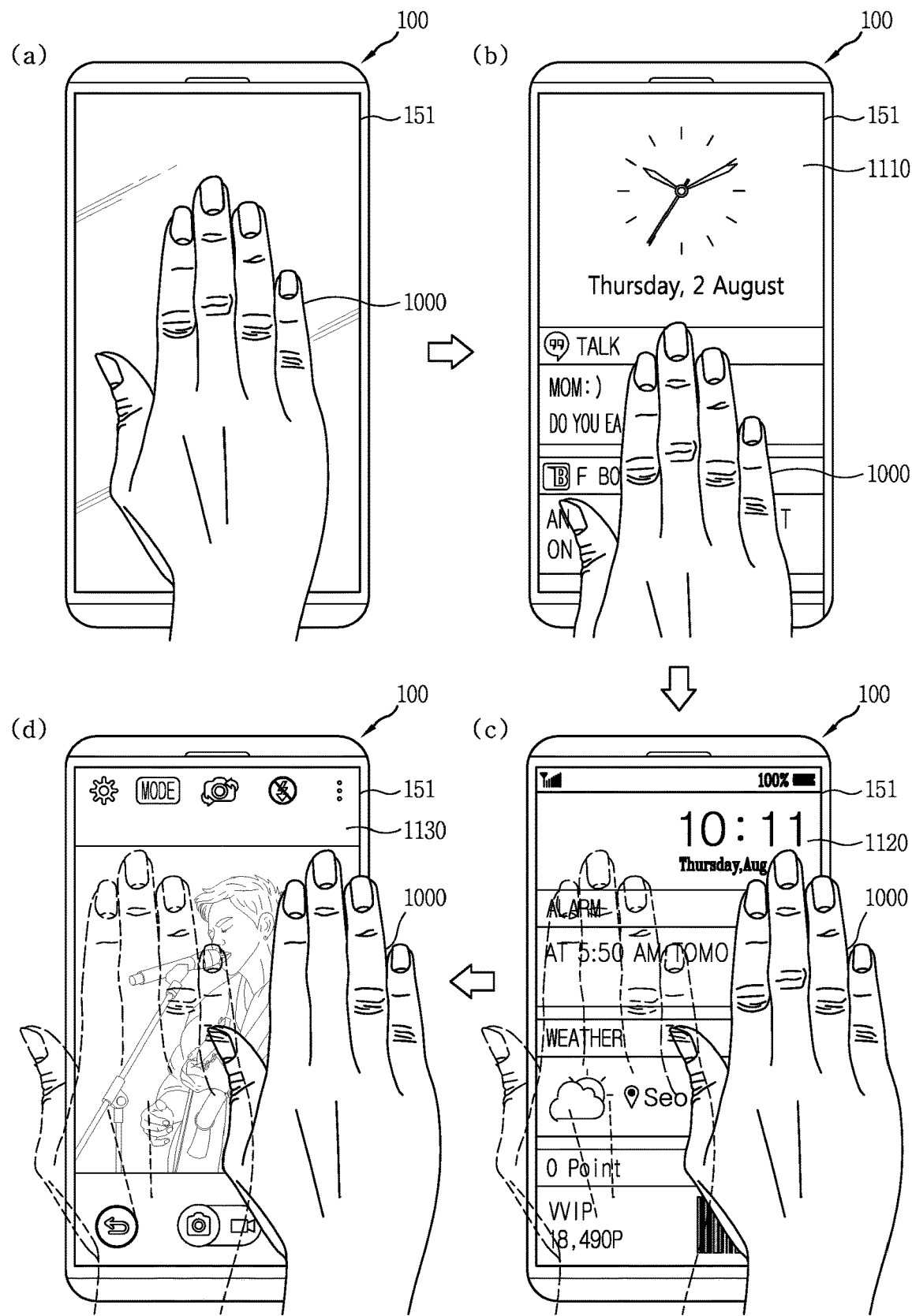

For example, as illustrated in (a) and (b) of FIG. 11, when the vein authentication of an object is successfully carried out through the first and second sensors 300, 200, the controller may switch a locked state of the terminal to an unlocked state (or a first unlocked state) and display a first page 1110 as illustrated in (b) of FIG. 11. Here, the first page 1110 may include event information. When an object movement in a left direction or a right direction is sensed while the first page 1110 is displayed, the controller 180 may display a second page 1120 different from the first page 1110 as illustrated in (c) of FIG. 11.

Here, the second page 1120 may include information related to the setting of an application.

Furthermore, when an object movement in a left direction or a right direction is sensed while the second page 1120 is displayed, the controller 180 may display a third page 1130 different from the second page 1120 as illustrated in (d) of FIG. 11. Here, an execution screen 1130 of a preset application may be displayed on the third page 1130.

As described above, in the mobile terminal according to the present disclosure, information displayed on the touch screen may be controlled based on the user's gesture, thereby providing convenience capable of controlling the terminal even when the user does not directly touch the terminal.

Meanwhile, in the mobile terminal according to the present disclosure, an object located in a three-dimensional space is sensed, and therefore, the object must be located in any one of sensing areas of the first and second sensors.

Accordingly, in the mobile terminal according to the present disclosure, when an object is out of the sensing area or exists in the sensing area while sensing is not allowed, guide information thereof may be displayed, thereby normally performing sensing and user authentication. Hereinafter, a method for providing such guide information will be described in detail with reference to the accompanying drawings. FIGS. 12A, 12B, 12C and 12D are conceptual views for explaining a method of guiding a sensing area in a vein authentication sensor according to the present disclosure.

As illustrated in (a) of FIG. 12A, in the mobile terminal according to the present disclosure, when the object 1000 is not located in a sensing area or is located in a sensing area while authentication is not allowed (or when the object is located in a sensing area in a state that does not satisfy a preset occupation criterion), guide information 1220 for guiding the positional movement of the object may be displayed as illustrated in (b) of FIG. 12A.

The controller 180 may control the touch screen 151 to display the guide information 1220. The guide information 1220 may include information on an area where the object 1000 must be located.

For another example, the guide information may include information on a relative distance between the object 1000 and the main body. For example, when the object 1000 is located closer to a preset reference distance from the main body 100 as illustrated in (a) and (b) of FIG. 12B, the controller 180 may display guide information 1220 for adjusting the distance of the object 1000 as illustrated in (c) of FIG. 12B.

Figure 12B:
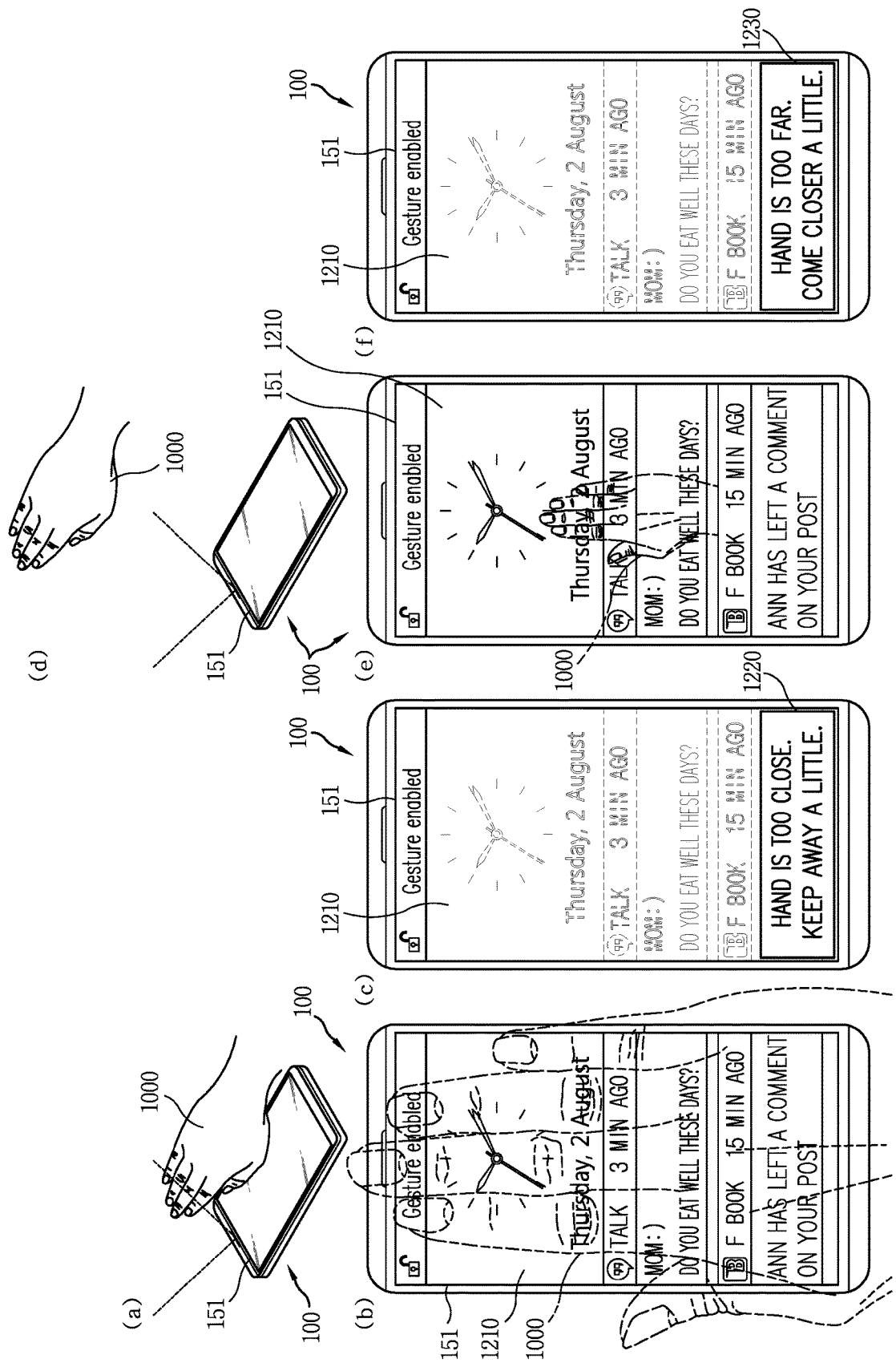

Similarly, when the object 1000 is located farther from a preset reference distance from the main body 100 as illustrated in (d) and (e) of FIG. 12B, the controller 180 may display guide information 1230 for adjusting the distance of the object 1000 as illustrated in (f) of FIG. 12B.

For another example, in the mobile terminal according to the present disclosure, a graphic object (or an indicator) for guiding the movement direction of the object may be displayed.

The touch screen 151 has a plurality of sides 151a, 151b, 151c, 151d, and the controller 180 may display an indicator on at least one of the plurality of sides 151a, 151b, 151c, 151d in proximity to a direction in which the object must move.

As illustrated in FIG. 12C, the guide information includes indicators 1240, 1250, 1260 for guiding the movement direction of the object, and the indicators 1240, 1250, 1260 may be displayed in proximity to at least one of the plurality of sides 151a, 151b, 151c, 151d of the touch screen, which is the closest to the object 1000.

For example, as illustrated in (a) of FIG. 12C, when the object 1000 is deviated to the right side in the sensing area with respect to the terminal body 100, the controller 180 may control the indicator 1240 to be displayed in proximity to the one side 151d located closest to the object 1000 among the plurality of sides 151a, 151b, 151c, 151d.

For another example, as illustrated in (b) of FIG. 12C, when the object 1000 is deviated to the upper side in the sensing area with respect to the terminal body 100, the controller 180 may control the indicator 1250 to be displayed in proximity to the one side 151a located closest to the object 1000 among the plurality of sides 151a, 151b, 151c, 151d.

For still another example, as illustrated in (c) of FIG. 12C, when the object 1000 is deviated to an upward slanting direction in the sensing area with respect to the terminal body 100, the controller 180 may control the indicator 1250 to be displayed in proximity to at least two sides 151a, 151b located closest to the object 1000 among the plurality of sides 151a, 151b, 151c, 151d.

On the other hand, as shown in FIG. 12D, such an indicator 1270 may be formed in a bar-shaped image extended along at least one side. Moreover, the controller 180 may control the touch screen to vary a display thickness of the bar-shaped image according to a degree of the object 1000 being out of the sensing area.

For example, when the object 1000 in (b) of FIG. 12D is located farther from the terminal body 100 than the object 1000 in (a) of FIG. 12D, a thickness of the indicator 1280 in (b) of FIG. 12D may be thicker than that of the indicator 1270 in (a) of FIG. 12D.

The controller 180 may change the display location and display thickness of the indicator according to the location of the object 1000. Therefore, the user may visually check that the display location and display thickness of the indicator varies, thereby recognizing how much the object must be moved.

In the above, a method of sensing an object in a locked state to release the locked state of the terminal has been described, but in the present disclosure, it may also be possible to sense an object to control the function of the terminal even in an unlocked state. Hereinafter, a method of controlling a terminal based on a gesture of an object will be described with reference to the accompanying drawings. FIGS. 13, 14, 15, 16, and 17 are conceptual views illustrating a method of controlling a mobile terminal in the mobile terminal according to the present disclosure.

The controller 180 may sense a gesture of the object using at least one of the first and second sensors 300, 200 in an unlocked state. Furthermore, the controller 180 may perform a preset function or control set in the sensed gesture.

For an example, the second sensor 200 may sense the positional movement of the object 1000, and when there is a movement of the object 1000, the controller 180 may compare a current location of the object 1000 with a location prior to the movement to recognize a movement direction of the object.

Figure 13:
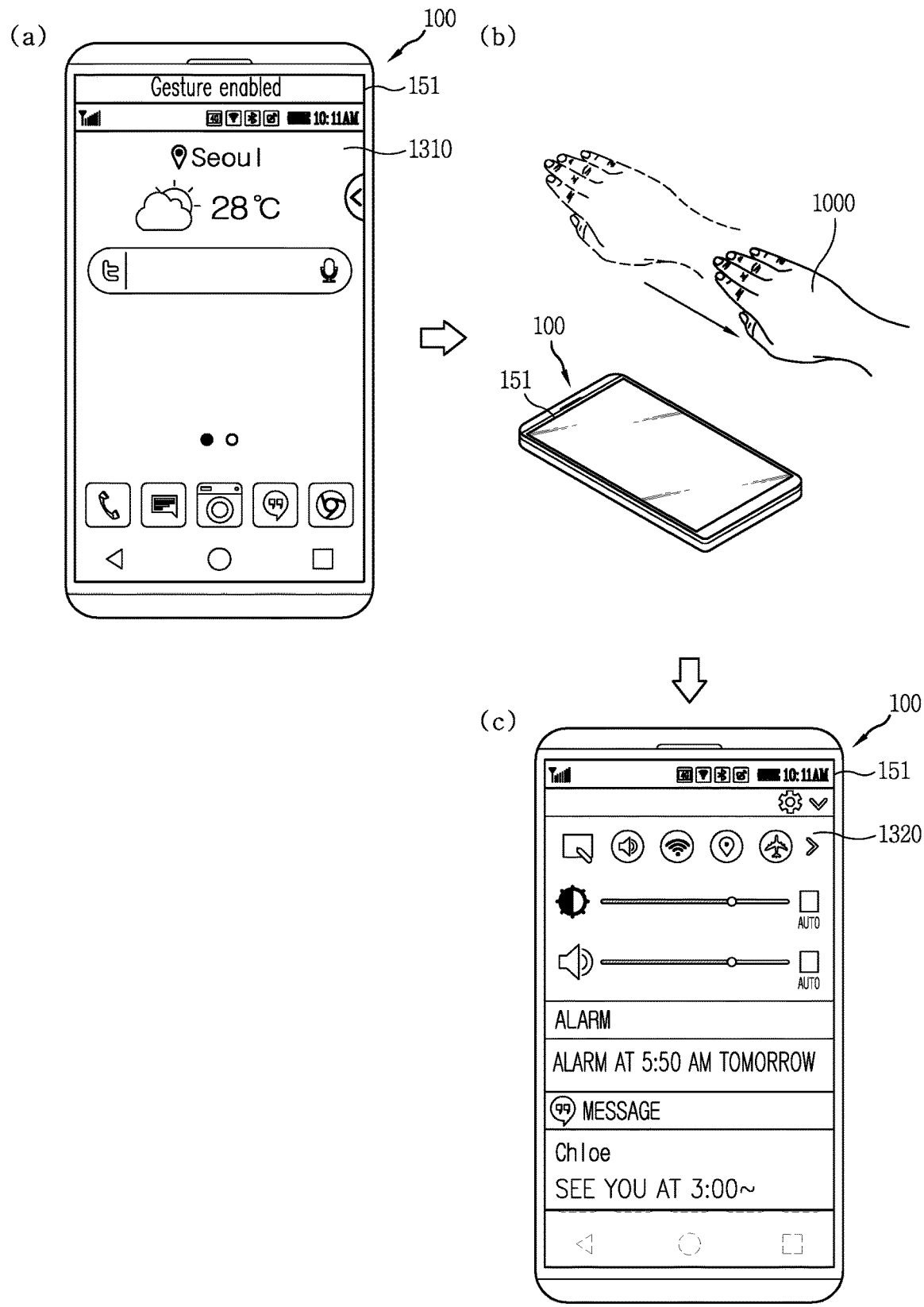

For example, in the present disclosure, as illustrated in (a) and (b) of FIG. 13, when the movement of an object in a preset direction (for example, movement in an upward and downward direction with respect to a length direction of the terminal) is sensed, a specific page 1320 containing notification information may be displayed as illustrated in (c) of FIG. 13.

Even when another screen is displayed as well as a home screen page 1310 is displayed on the touch screen 151 as illustrated in (a) of FIG. 13, the controller 180 may display a specific page 1320 containing notification information as illustrated in (c) of FIG. 13 when the movement of an object in a preset direction (for example, movement in an upward and downward direction with respect to a length direction of the terminal) is sensed.

Figure 14:
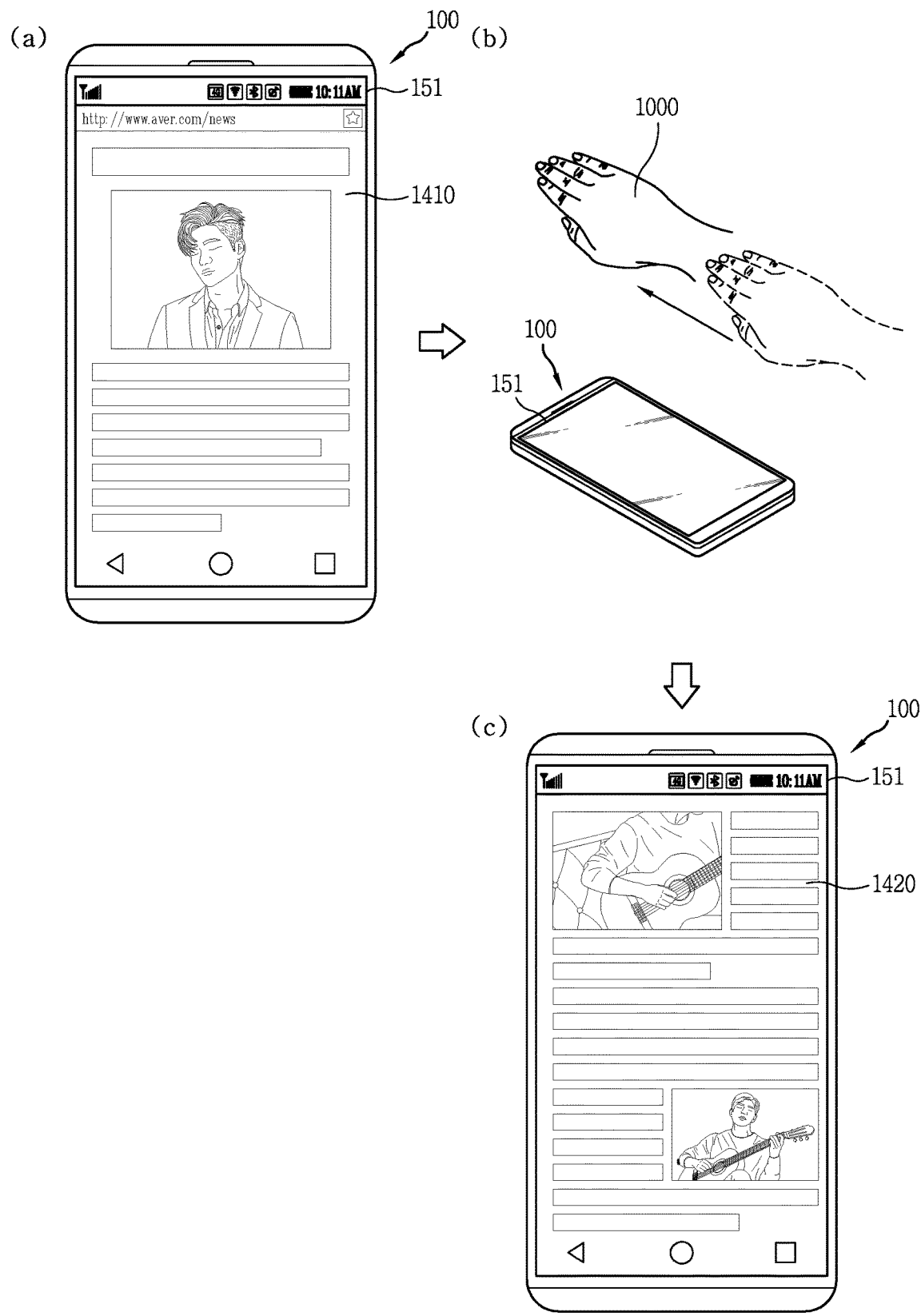

For another example, as illustrated in (a) and (b) of FIG. 14, an upward and downward movement of the object may be processed as a command for scrolling information displayed on the touch screen. Accordingly, when it is sensed that the object 1000 moves based on a length direction of the terminal, the controller 180 may scroll information displayed on the touch screen, as illustrated in (c) of FIG. 14.

Although not shown, when a gesture of the object in a width direction is sensed while a home screen page is displayed on the touch screen 151, the controller 180 may switch the currently displayed home screen page to another home screen page.

Figure 15:
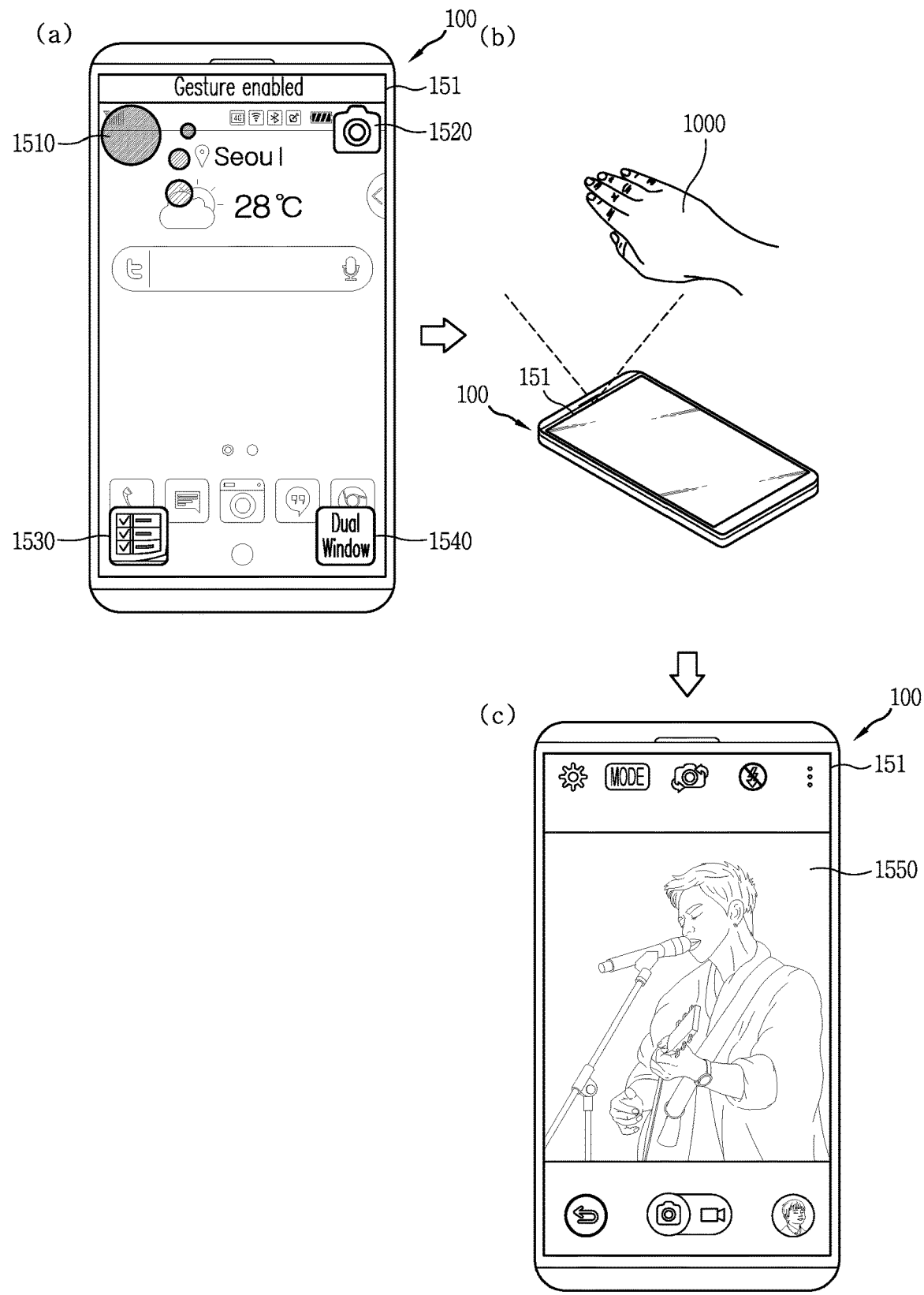

For still another example, as illustrated in (a) of FIG. 15, when the object 1000 is sensed, the controller 180 may display at least one icon 1510, 1520, 1530, 1540 corresponding to at least one executable application using a gesture of the object 1000.

The controller 180 may display the at least one icon 1510, 1520, 1530, 1540 only when a preset gesture is taken by the object 1000. On the other hand, whether an icon of which application is to be displayed may be determined based on the user's selection. Moreover, when the object 1000 moves toward any one of the at least one icon 1510, 1520, 1530, 1540 as illustrated in (b) of FIG. 15, the controller 180 may execute an application (for example, a camera function application) corresponding to the any one icon, and display an execution screen 1550 corresponding thereto on the touch screen 151.

Meanwhile, the at least one icon 1510, 1520, 1530, 1540 may be displayed only after the authentication of a legitimate user is completed through vein authentication.

Figure 16:
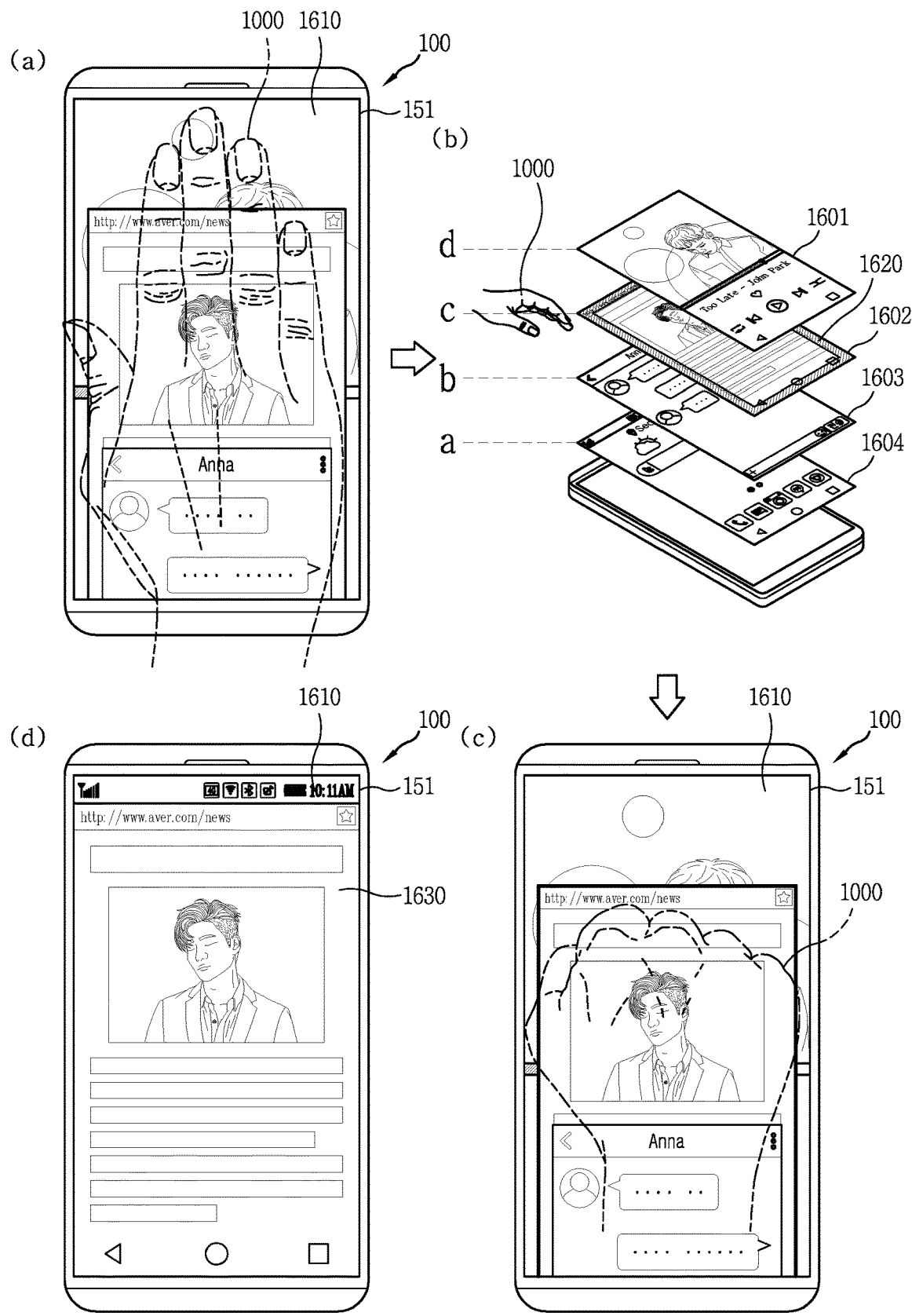

Moreover, in the mobile terminal according to the present disclosure, as illustrated in FIG. 16, any one of a plurality of content items may be selected using a relative distance between the object 1000 and the terminal body 100. Here, the plurality of content items may be an execution screen of a recently executed application or an execution screen of a frequently used application. Furthermore, in addition to this, a plurality of content items may be carried out in various ways.

When a plurality of content items 1601, 1602, 1603, 1604 are displayed in a stacked form as illustrated in (a) and (b) of FIG. 16, the controller may designate any one of the plurality of content items 1601, 1602, 1603, 1604 as selection target content based on a distance between the object 1000 and the main body 100.

The controller 180 may divide the distance between the object 1000 and the main body 100 into a plurality of sections (a, b, c, d), and allow any one of the plurality of content items to correspond to each section. Depending on the number of content items, the number of sections to be divided may vary.

Furthermore, the controller 180 may set content 1602 corresponding to a section in which the object 1000 is currently located among the plurality of sections as selection target content.

At this time, the controller 180 may display an indicator (or graphic object 1620) in at least one area of the selection target content 1602 to allow the user to recognize what is the selection target content.

On the other hand, when a preset gesture of the object is sensed in a state where the selection target content 1602 is set or designated as illustrated in (c) of FIG. 16, the controller 180 may display screen information 1630 corresponding to the selection target content 1602 on the touch screen 151.

As described above, in the present disclosure, it may be possible to perform control on screen information in various ways using distance information between the object and the main body.

Moreover, in the mobile terminal according to the present disclosure, a function of an application or a function of the terminal may be controlled using a gesture of the object.

In the present disclosure, a specific gesture of the object may be assigned to a specific function of the terminal or a specific control function of the application.

For example, in a state where an execution screen 1710 of a music-related application is displayed as shown in (a) of FIG. 17, when the object 1000 is sensed as illustrated in (b) of FIG. 17, and a relative distance between the object 1000 and the main body 100 varies as illustrated in (c) of FIG. 17, the controller 180 may process it as a control command of volume function. The controller 180 may increase or decrease a volume based on a relative distance variation between the object 1000 and the main body 100.

Such a gesture of the object 1000 may be used similarly in adjusting the volume of the mobile terminal not only when an execution screen of a music-related application is displayed but also when another type of screen is displayed on the touch screen.

Meanwhile, the type of gesture may be modified in various ways, and in the present disclosure, different functions may be assigned to different gestures of the object, thereby controlling the function of the terminal only by the gesture of the object.

For an example, as illustrated in (d) and (e) of FIG. 17, when the object takes a gesture of seemingly indicating something, the controller 180 may recognize it as a gesture of selecting content or an icon on a screen displayed on the touch screen 151.

In this case, the controller 180 may highlight and display selectable icons, thereby guiding information on which icons are selectable for the user. Moreover, when an additional gesture for selecting a specific icon is applied by the object 1000 while a specific icon is indicated, the controller 180 may execute a function corresponding to the specific icon.

As described above, in the mobile terminal according to the present disclosure, the controller may control the terminal using a user's gesture, thereby controlling the terminal without directly touching the terminal.

As described above, according to a mobile terminal in accordance with the present disclosure and a control method thereof, a user's body located in a three-dimensional space may be sensed to authenticate the user's vein, thereby obtaining convenience capable of allowing the user to perform user authentication even when he or she does not directly touch or manipulate the mobile terminal.

Furthermore, according to a mobile terminal in accordance with the present disclosure and a control method thereof, even when the terminal is in a standby state, a locked state, or a touch screen is off, it may be possible to recognize a user approaching the terminal using a specific sensor, and execute a process for vein authentication based on the user being authenticated. Accordingly, the user may perform vein authentication without directly manipulating the terminal.

In addition, according to a mobile terminal in accordance with the present disclosure and a control method thereof, it may be possible to recognize whether a user's body part approaching the terminal is a body part suitable for vein authentication, and activate a vein authentication sensor based on the result. Accordingly, in the present disclosure, the vein authentication sensor for vein authentication may not be continuously activated, but activated only when a body part suitable for vein authentication is sensed, and as a result, unnecessary power consumption may be reduced.

Moreover, according to a mobile terminal in accordance with the present disclosure and a control method thereof, an unlocking process may be divided into a plurality of steps to accurately know a user's intention to use the terminal. Accordingly, when a user approaches the terminal with no intention to use the terminal, it may be possible to prevent the terminal from being unlocked unnecessarily.

What is claimed is:

1. A mobile terminal, comprising:
a main body;
a touch screen disposed on a front side of the main body;
a first sensor disposed on the front side to sense an approach and a shape of an object to the main body in a locked state of the mobile terminal;
a second sensor to be driven in either one of a sleep mode and an active mode, so as to acquire a vein image of the object that has approached the first sensor in the active mode; and
a controller configured to perform a vein authentication using the vein image acquired through the second sensor, and control the touch screen to display security information allowed to access for a pre-registered user when the vein image corresponds to a vein image of the pre-registered user as a result of the vein authentication,
wherein the first sensor senses the approach of the object to the main body while the second sensor is driven in the sleep mode,
wherein the controller is further configured to:
control the first sensor to determine whether the shape of the object corresponds to a shape of a palm in response to the approach of the object to the main body;
control the first sensor to generate an active event signal for changing an operation mode of the second sensor from the sleep mode to the active mode, when the object approaching the main body corresponds to the palm; and
control the second sensor to maintain the sleep mode, when the shape of the object approaching the main body does not correspond to the shape of the palm.

2. The mobile terminal of claim 1, wherein the first sensor is further configured to sense a material of the object, and wherein the controller is further configured to:
determine whether the material of the object is made of a human body; and
control the first sensor to determine whether the shape of the object corresponds to the shape of the palm in response to the approach of the object to the main body.

3. The mobile terminal of claim 2, wherein the first sensor maintains a low power active mode driven with power equal to or less than a preset value when the mobile terminal is in the locked state, and
the second sensor is driven in either one of the sleep mode and the active mode according to whether the object is a pre-specified body part in the locked state.

4. The mobile terminal of claim 1, wherein
the controller maintains the locked state while the vein image of the palm is acquired through the second sensor operating in the active mode.

5. The mobile terminal of claim 4, wherein the controller controls the second sensor to allow the operation mode of the second sensor to be maintained in the sleep mode in the locked state, when the object that has approached the first sensor does not correspond to the shape of the palm.

6. The mobile terminal of claim 1, wherein the controller changes the locked state of the mobile terminal to a completely unlocked state through first and second unlocking processes,
the first unlocking process is a process of determining whether the vein image acquired through the second sensor corresponds to the vein image of the pre-registered user, and
the second unlocking process is a process of sensing a preset gesture of the object.

7. The mobile terminal of claim 6, wherein a state in which the security information is displayed is a first unlocked state,
the security information comprises at least one event information generated in an application installed in the mobile terminal, and
the controller controls the touch screen to end the display of the security information, and switches the first unlocked state to the locked state when the preset gesture of the object is not sensed within a preset period of time after the security information is displayed in the first unlocked state.

8. The mobile terminal of claim 6, wherein a state in which the security information is displayed is a first unlocked state, and
the controller controls the touch screen to display additional security information when the preset gesture of the object is sensed within a preset period of time in the first unlocked state, and switches the first unlocked state to a completely unlocked state.

9. The mobile terminal of claim 1, wherein the second sensor comprises:
an infrared light emitting portion configured to emit light containing an infrared region wavelength; and
a depth sensing unit configured to receive light emitted from the infrared light emitting unit and reflected from the object located in a sensing area of the second sensor, and acquire the vein image of the object based on an arrival time of the received light,
wherein the sensing area of the second sensor is a three-dimensional space defined within a preset distance and angular range with respect to an area of the second sensor.

10. The mobile terminal of claim 9, wherein the controller displays guide information for guiding a positional movement of the object when the object is located within the sensing area in a state that does not satisfy a preset occupancy criterion.

11. The mobile terminal of claim 10, wherein the touch screen has a plurality of sides,
the guide information comprises an indicator for guiding a movement direction of the object, and
the indicator is displayed in proximity to at least one side closest to the object among the plurality of sides of the touch screen.

12. The mobile terminal of claim 11, wherein the indicator comprises a bar-shaped image extended along the at least one side, and
the controller controls the touch screen to vary a display thickness of the bar-shaped image according to a degree of the object being out of the sensing area.

13. The mobile terminal of claim 9, wherein a plurality of security information exist in a plurality of pages, and
the controller controls the touch screen to display security information contained in any one of the plurality of pages based on a relative distance between the main body and the object sensed through the depth sensing unit.

14. The mobile terminal of claim 1, wherein the controller performs control related to at least part of the security information based on a preset gesture of the object located in a sensing area of the second sensor while the security information is displayed.

15. The mobile terminal of claim 14, wherein the security information comprises at least one content related to at least one application, and
the controller performs control related to specific content displayed in an area corresponding to a place where the object is located among the at least one content when the preset gesture is sensed.

16. A mobile terminal, comprising:
a main body;
a touch screen disposed on a front side of the main body;
a first sensor disposed on the front side to sense an approach and a shape of an object to the main body in a locked state of the mobile terminal;
a second sensor to be driven in either one of a sleep mode and an active mode to acquire a vein image of the object that has approached the first sensor in the active mode; and
a controller configured to:
control the first sensor to determine whether the shape of the object corresponds to a shape of a palm in response to the approach of the object to the main body,
control the first sensor to generate an active event signal for changing an operation mode of the second sensor from the sleep mode to the active mode, when the object approaching the main body corresponds to the palm,
control the second sensor to maintain the sleep mode, when the shape of the object approaching the main body does not correspond to the shape of the palm,
perform authentication for a legitimate user using the vein image acquired through the second sensor,
control the touch screen to display content related to a user privacy when the authentication for the legitimate user is successful,
switch the locked state to an unlocked state when a preset gesture of the object is sensed through the second sensor while the content related to the user privacy is displayed, and
control the touch screen to display a home screen page in the unlocked state.

17. The mobile terminal of claim 16, wherein the controller controls the touch screen to end the display of the content when the preset gesture is not sensed for a preset period of time while the content is displayed.

18. The mobile terminal of claim 16, wherein the first sensor maintains a low power active mode driven with power equal to or less than a preset value in the locked state, and senses the approach of the object to the main body while the second sensor is driven in the sleep mode.

19. The mobile terminal of claim 18, wherein the second sensor changes from the sleep mode to the active mode when the object that has approached the first sensor corresponds to a pre-specified body part.

20. A mobile terminal, comprising:
a main body structure including a processor;
a touch screen disposed on one side of the main body structure; and
a first sensor and a second sensor disposed on the main body structure,
wherein the processor is configured to:
control the first sensor to sense an approach and a shape of an object to the main body structure, when the mobile terminal is in a locked state and the second sensor is in a sleep mode,
control the first sensor to determine whether the shape of the object corresponds to a shape of palm in response to the approach of the object to the main body,
control the first sensor to generate an active event signal for changing an operation mode of the second sensor from the sleep mode to an active mode, when the object approaching the main body corresponds to the palm,
control the second sensor to maintain the sleep mode, when the shape of the object approaching the main body does not correspond to the shape of the palm,
control the second sensor to switch from the sleep mode to the active mode based on a result of the first sensor sensing the approach of the object,
obtain vein image information of the object that has approached when the second sensor is in the active mode,
perform a vein authentication using the vein image information obtained through the second sensor, and
control the touch screen to display predetermined content based on a result of the vein authentication.

* * * * *